US010430866B2

(12) United States Patent
Glass et al.

(10) Patent No.: US 10,430,866 B2
(45) Date of Patent: Oct. 1, 2019

(54) PERSONALIZED WEBPAGE GIFTING SYSTEM AND METHOD

(71) Applicant: GIFT CARD IMPRESSIONS, LLC, Kansas City, MO (US)

(72) Inventors: Brett R. Glass, Kansas City, MO (US); Nicole E. Glass, Kansas City, MO (US); Karl Joseph Geisler, Kansas City, MO (US); Elizabeth Ann Trimble, Kansas City, MO (US); Dominique Michelle Pierron O'Hara, Kansas City, MO (US)

(73) Assignee: Gift Card Impressions, LLC, Kansas City, MO (US)

( * ) Notice: Subject to any disclaimer, the term of this patent is extended or adjusted under 35 U.S.C. 154(b) by 443 days.

(21) Appl. No.: 14/575,488

(22) Filed: Dec. 18, 2014

(65) Prior Publication Data

US 2015/0106225 A1 Apr. 16, 2015

Related U.S. Application Data

(63) Continuation-in-part of application No. 13/964,895, filed on Aug. 12, 2013, now abandoned, which is a (Continued)

(51) Int. Cl.
*G06Q 30/00* (2012.01)
*G06Q 30/06* (2012.01)

(Continued)

(52) U.S. Cl.
CPC ....... *G06Q 30/0641* (2013.01); *G06F 3/0482* (2013.01); *G06F 3/04842* (2013.01);

(Continued)

(58) Field of Classification Search
CPC ...................................................... G06Q 30/00
See application file for complete search history.

(56) References Cited

U.S. PATENT DOCUMENTS 5,708,780 A * 1/1998 Levergood ............. G06F 21/41 709/203
5,963,915 A * 10/1999 Kirsch .................. G06Q 20/12 705/26.8

(Continued)

OTHER PUBLICATIONS

Desktop Documentaries, "DIY Home made videos: 10 Fun & Creative videos gift ideas", webpage, dated May 28, 2010. (Year: 2010).*

*Primary Examiner* — Mark A Fadok
(74) *Attorney, Agent, or Firm* — Erise IP, P.A.

(57) ABSTRACT

A personalized webpage gifting system includes a server in communication with a computing device having a processor to execute an application. Upon execution, the application generates generate a graphical user interface (GUI) to receive recipient information from each of a plurality of participants in which the recipient information user-supplied content associated with a recipient from each of a plurality of participants, and a monetary amount to be contributed towards purchase of a gift for the recipient. The application then combines the user-supplied content of each participant to form a personalized content structure, wherein the application is further executable to facilitate transmission of the gift and the personalized content structure to the recipient.

4 Claims, 32 Drawing Sheets

Related U.S. Application Data continuation-in-part of application No. 13/753,453, filed on Jan. 29, 2013.

(60) Provisional application No. 61/918,010, filed on Dec. 19, 2013, provisional application No. 61/592,320, filed on Jan. 30, 2012, provisional application No. 61/698,410, filed on Sep. 7, 2012, provisional application No. 61/737,729, filed on Dec. 14, 2012, provisional application No. 61/737,731, filed on Dec. 14, 2012.

(51) Int. Cl.

| | |
|---|---|
| *H04L 29/08* | (2006.01) |
| *H04L 12/58* | (2006.01) |
| *G06F 3/0482* | (2013.01) |
| *G06F 3/0484* | (2013.01) |
| *G06Q 20/12* | (2012.01) |
| *G06Q 20/38* | (2012.01) |
| *G06Q 50/00* | (2012.01) |
| *G06Q 20/34* | (2012.01) |

(52) U.S. Cl.

CPC ........... *G06Q 20/12* (2013.01); *G06Q 20/342* (2013.01); *G06Q 20/387* (2013.01); *G06Q 50/01* (2013.01); *H04L 51/32* (2013.01); *H04L 67/10* (2013.01)

(56) References Cited

U.S. PATENT DOCUMENTS

| | | | | |
|---|---|---|---|---|
| 9,483,786 | B2 * | 11/2016 | Glass | G06Q 30/0621 |
| 2006/0007243 | A1 * | 1/2006 | Miller | G11B 27/034 345/619 |
| 2010/0017262 | A1 * | 1/2010 | Iyer | G06F 17/30864 705/7.39 |
| 2010/0114596 | A1 * | 5/2010 | Williams | G06Q 10/10 705/2 |
| 2012/0226614 | A1 * | 9/2012 | Gura | G06Q 20/12 705/44 |
| 2012/0271732 | A1 * | 10/2012 | Glass | G06Q 30/0621 705/26.5 |
| 2013/0073430 | A1 * | 3/2013 | Gallen | G06Q 50/01 705/26.41 |
| 2013/0110671 | A1 * | 5/2013 | Gray | G06Q 30/0643 705/26.8 |
| 2013/0151432 | A1 * | 6/2013 | Kashner | G06Q 40/02 705/329 |
| 2013/0185122 | A1 * | 7/2013 | Smadja | G06Q 30/0277 705/12 |
| 2013/0211954 | A1 * | 8/2013 | Linden | G06Q 30/0621 705/26.8 |
| 2013/0211970 | A1 * | 8/2013 | Glass | G06Q 30/0641 705/27.1 |
| 2013/0226728 | A1 * | 8/2013 | Oghittu | G06Q 30/0621 705/26.5 |
| 2013/0282514 | A1 * | 10/2013 | Dougherty | G06Q 30/02 705/26.5 |
| 2013/0304605 | A1 * | 11/2013 | Glass | G06Q 30/0621 705/26.5 |
| 2013/0325671 | A1 * | 12/2013 | Glass | G06Q 30/0641 705/27.1 |
| 2013/0346337 | A1 * | 12/2013 | O'Donnell | G06Q 10/0833 705/333 |
| 2014/0040184 | A1 * | 2/2014 | Benissan | G06F 17/30699 707/609 |
| 2014/0089128 | A1 * | 3/2014 | Stauffer | H04N 21/47815 705/26.5 |
| 2016/0019630 | A1 * | 1/2016 | Vippagunta | G06Q 30/0631 705/26.8 |

* cited by examiner

FIG. 4

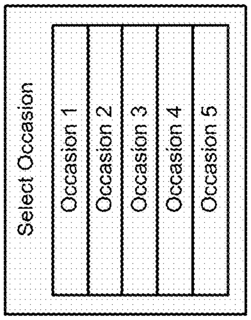

FIG. 5

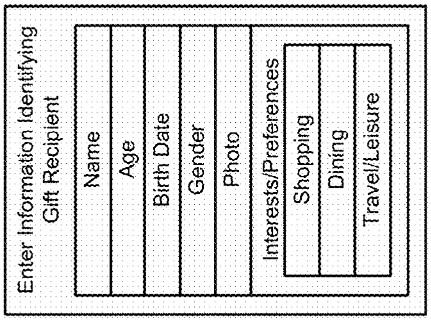

FIG. 6

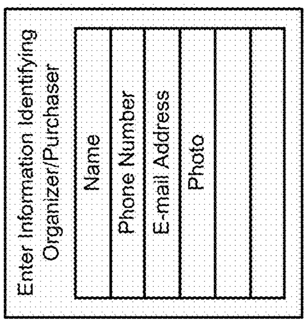

FIG.7

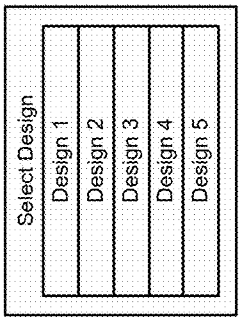

FIG. 8

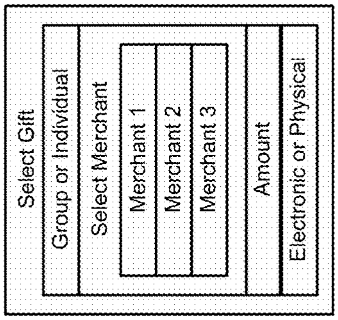

FIG. 9

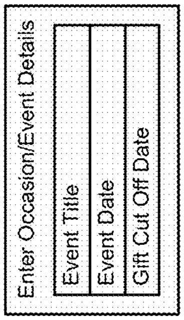

FIG. 10

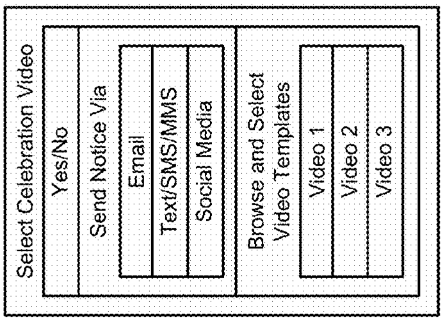

FIG. 4 Select Occasion
- Occasion 1
- Occasion 2
- Occasion 3
- Occasion 4
- Occasion 5

FIG. 5 Enter Information Identifying Gift Recipient
- Name
- Age
- Birth Date
- Gender
- Photo
- Interests/Preferences
  - Shopping
  - Dining
  - Travel/Leisure

FIG. 6 Enter Information Identifying Organizer/Purchaser
- Name
- Phone Number
- E-mail Address
- Photo

FIG. 7 Select Design
- Design 1
- Design 2
- Design 3
- Design 4
- Design 5

FIG. 8 Select Gift
- Group or Individual
- Select Merchant
  - Merchant 1
  - Merchant 2
  - Merchant 3
- Amount
- Electronic or Physical

FIG. 9 Enter Occasion/Event Details
- Event Title
- Event Date
- Gift Cut Off Date

FIG. 10 Select Celebration Video
- Yes/No
- Send Notice Via
  - Email
  - Text/SMS/MMS
  - Social Media
- Browse and Select Video Templates
  - Video 1
  - Video 2
  - Video 3

| HOME | START THE OCCASION | OCCASIONS |
|---|---|---|

GENERAL
ALL DESIGNS
FEATURED DESIGNS
NEW DESIGNS

| BIRTHDAY | HOLIDAY | THANK YOU |
|---|---|---|
| CONGRATULATIONS | WEDDING | BABY |

SEASONAL
CHRISTMAS
HANUKKAH
VALENTINE'S DAY
EASTER
MOTHER'S DAY
FATHER'S DAY

OCCASIONS
ANNIVERSARY
BABY
BACK-TO-SCHOOL
BIRTHDAY
BRIDAL
CONGRATULATIONS
GRADUATION
HOUSE WARMING
THANK YOU
WEDDING

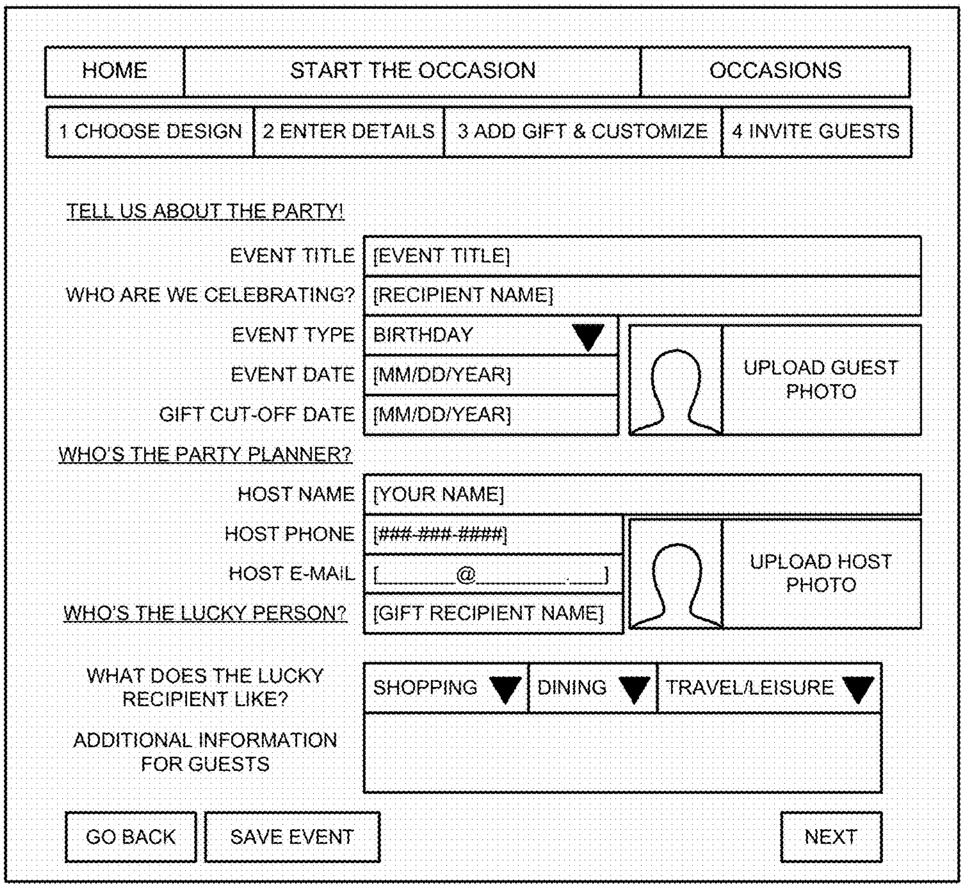

FIG. 17

| HOME | START THE OCCASION | OCCASIONS |

| 1 CHOOSE DESIGN | 2 ENTER DETAILS | 3 ADD GIFT & CUSTOMIZE | 4 INVITE GUESTS |

TELL US ABOUT THE PARTY!

| | |
|---|---|
| EVENT TITLE | [EVENT TITLE] |
| WHO ARE WE CELEBRATING? | [RECIPIENT NAME] |
| EVENT TYPE | BIRTHDAY ▼ |
| EVENT DATE | [MM/DD/YEAR] |
| GIFT CUT-OFF DATE | [MM/DD/YEAR] |

UPLOAD GUEST PHOTO

WHO'S THE PARTY PLANNER?

| | |
|---|---|
| HOST NAME | [YOUR NAME] |
| HOST PHONE | [###-###-####] |
| HOST E-MAIL | [_____@_____] |
| WHO'S THE LUCKY PERSON? | [GIFT RECIPIENT NAME] |

UPLOAD HOST PHOTO

| WHAT DOES THE LUCKY RECIPIENT LIKE? | SHOPPING ▼ | DINING ▼ | TRAVEL/LEISURE ▼ |
| ADDITIONAL INFORMATION FOR GUESTS | | | |

| GO BACK | SAVE EVENT | | NEXT |

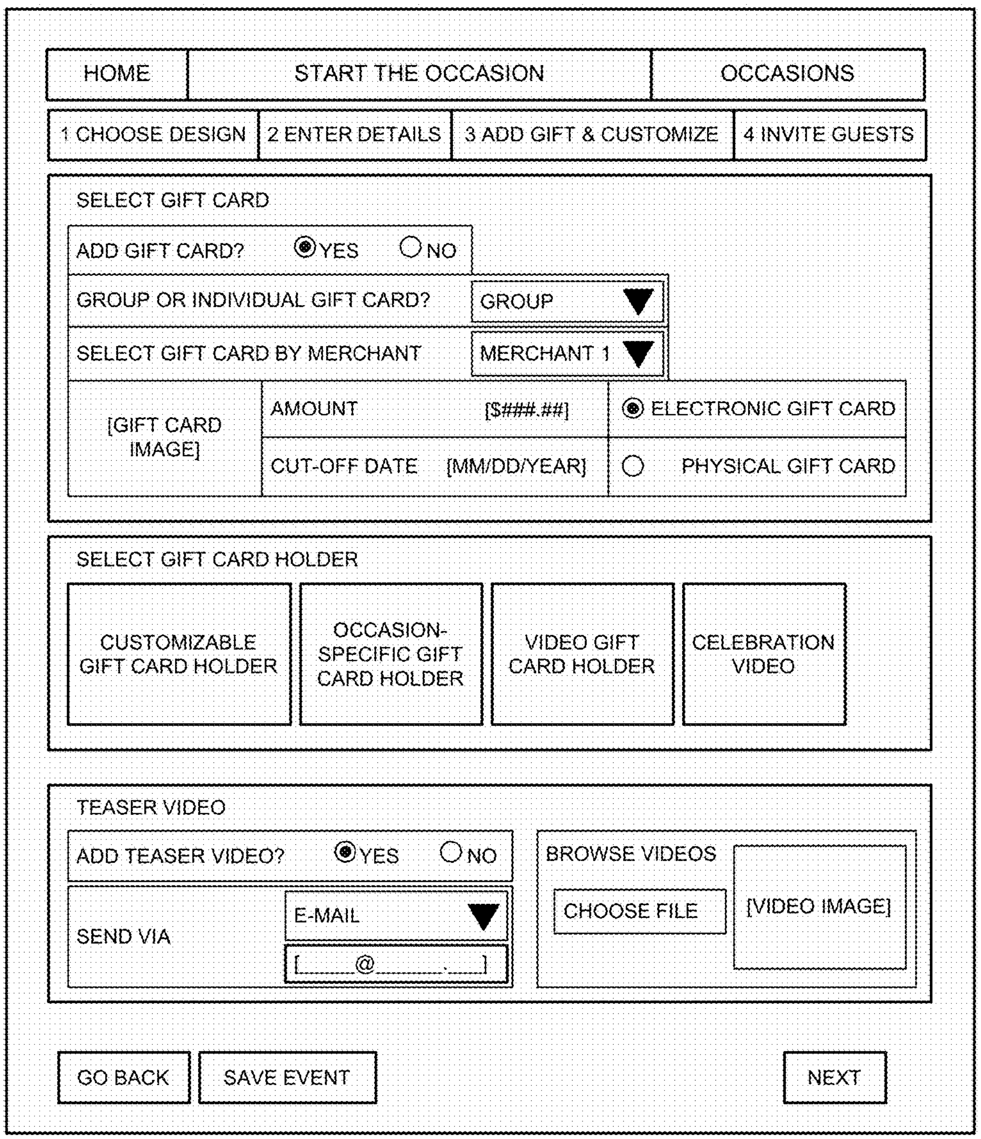

FIG. 18A

| HOME | START THE OCCASION | OCCASIONS |

| 1 CHOOSE DESIGN | 2 ENTER DETAILS | 3 ADD GIFT & CUSTOMIZE | 4 INVITE GUESTS |

SELECT GIFT CARD

ADD GIFT CARD? ●YES ○NO

GROUP OR INDIVIDUAL GIFT CARD? GROUP ▼

SELECT GIFT CARD BY MERCHANT MERCHANT 1 ▼

| [GIFT CARD IMAGE] | AMOUNT | [$###.##] | ● ELECTRONIC GIFT CARD |
| | CUT-OFF DATE | [MM/DD/YEAR] | ○ PHYSICAL GIFT CARD |

SELECT GIFT CARD HOLDER

| CUSTOMIZABLE GIFT CARD HOLDER | OCCASION-SPECIFIC GIFT CARD HOLDER | VIDEO GIFT CARD HOLDER | CELEBRATION VIDEO |

TEASER VIDEO

ADD TEASER VIDEO? ●YES ○NO

SEND VIA  E-MAIL ▼  [___@___.___]

BROWSE VIDEOS  CHOOSE FILE  [VIDEO IMAGE]

[GO BACK] [SAVE EVENT]  [NEXT]

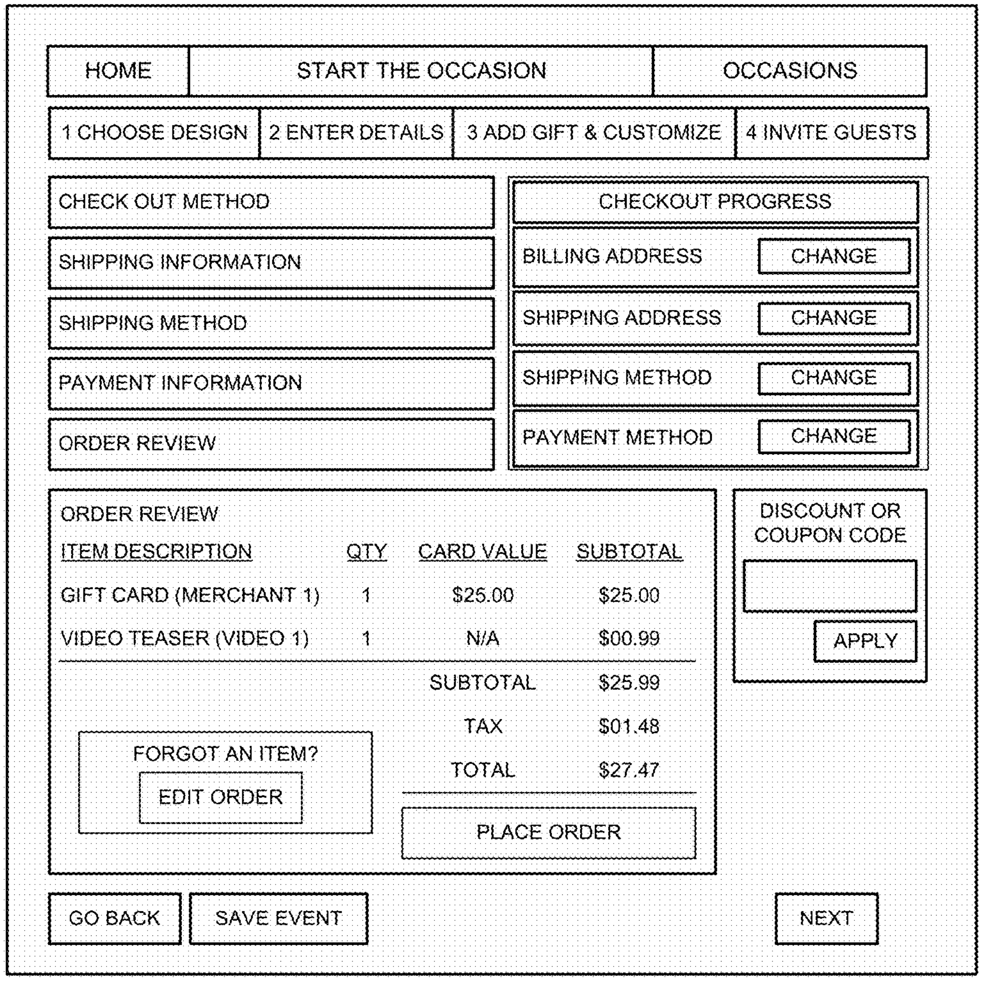

FIG. 20

| HOME | START THE OCCASION | OCCASIONS |

| 1 CHOOSE DESIGN | 2 ENTER DETAILS | 3 ADD GIFT & CUSTOMIZE | 4 INVITE GUESTS |

| CHECK OUT METHOD | | CHECKOUT PROGRESS | |
|---|---|---|---|
| SHIPPING INFORMATION | | BILLING ADDRESS | CHANGE |
| SHIPPING METHOD | | SHIPPING ADDRESS | CHANGE |
| PAYMENT INFORMATION | | SHIPPING METHOD | CHANGE |
| ORDER REVIEW | | PAYMENT METHOD | CHANGE |

ORDER REVIEW

| ITEM DESCRIPTION | QTY | CARD VALUE | SUBTOTAL |
|---|---|---|---|
| GIFT CARD (MERCHANT 1) | 1 | $25.00 | $25.00 |
| VIDEO TEASER (VIDEO 1) | 1 | N/A | $00.99 |
| | | SUBTOTAL | $25.99 |
| | | TAX | $01.48 |
| | | TOTAL | $27.47 |

FORGOT AN ITEM?
EDIT ORDER

PLACE ORDER

DISCOUNT OR COUPON CODE

APPLY

GO BACK | SAVE EVENT | NEXT

| HOME | START THE OCCASION | OCCASIONS |

| 1 EVENT SETUP | 2 ADD GIFT & CUSTOMIZE | 3 CHECKOUT | 4 INVITE GUESTS |

INVITE GUESTS

| ADD EMAIL ADDRESSES | ADD FROM SOCIAL MEDIA 1 | ADD FROM SOCIAL MEDIA 2 | ADD FROM SOCIAL MEDIA 3 |

"Add email addresses separated by commas or returns."

+ADD TO GUEST LIST

GUEST LIST

| NAME | EMAIL ADDRESS | EDIT/REMOVE |
|---|---|---|
| | | EDIT |

GO BACK    SAVE EVENT    NEXT

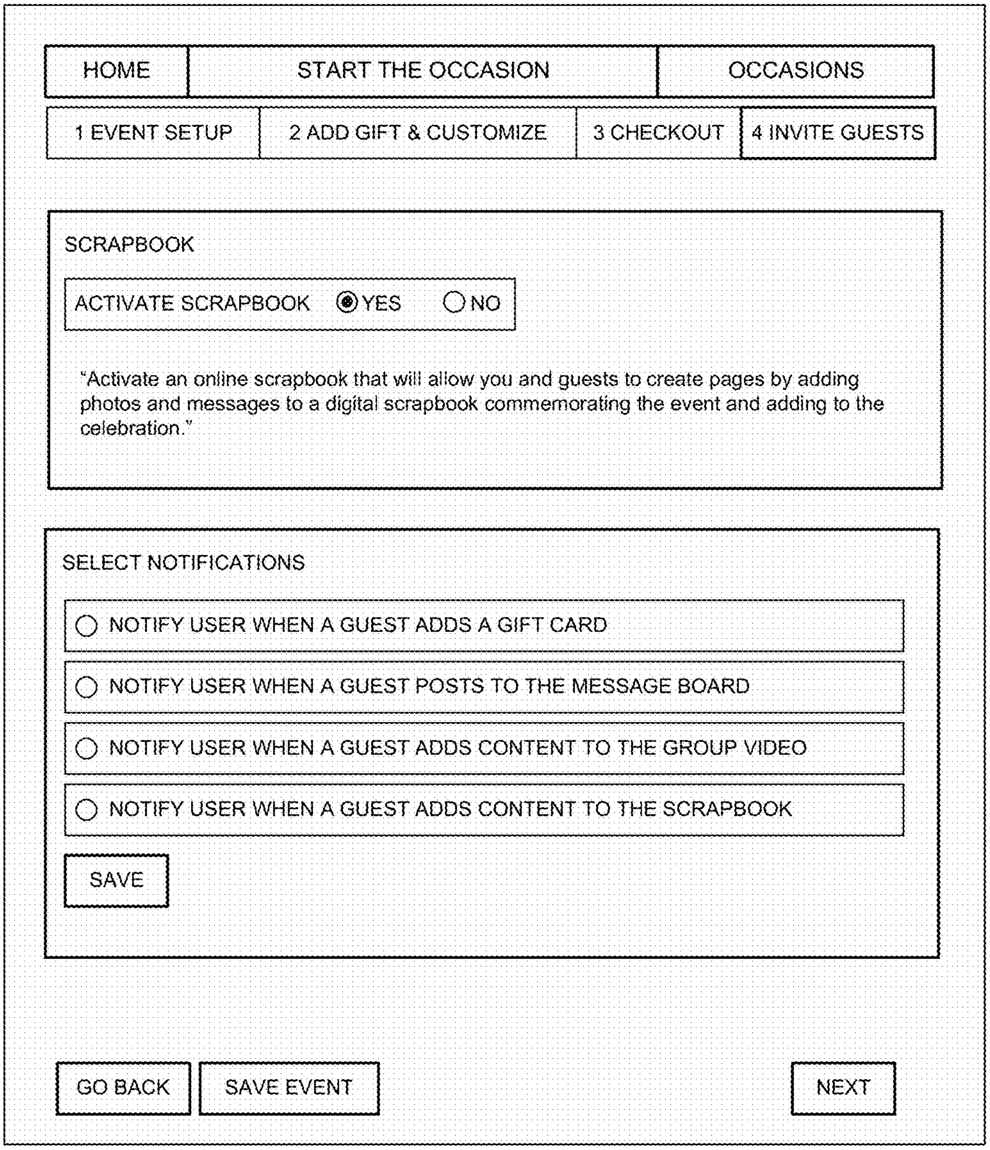

FIG. 24

| HOME | START THE OCCASION | OCCASIONS |
|---|---|---|
| 1 EVENT SETUP | 2 ADD GIFT & CUSTOMIZE | 3 CHECKOUT | 4 INVITE GUESTS |

SCRAPBOOK

ACTIVATE SCRAPBOOK  ●YES  ○NO

"Activate an online scrapbook that will allow you and guests to create pages by adding photos and messages to a digital scrapbook commemorating the event and adding to the celebration."

SELECT NOTIFICATIONS

○ NOTIFY USER WHEN A GUEST ADDS A GIFT CARD

○ NOTIFY USER WHEN A GUEST POSTS TO THE MESSAGE BOARD

○ NOTIFY USER WHEN A GUEST ADDS CONTENT TO THE GROUP VIDEO

○ NOTIFY USER WHEN A GUEST ADDS CONTENT TO THE SCRAPBOOK

SAVE

GO BACK    SAVE EVENT                                              NEXT

PERSONALIZED WEBPAGE GIFTING SYSTEM AND METHOD

CROSS REFERENCE TO RELATED APPLICATIONS

This application claims priority to U.S. Patent Application Ser. No. 61/918,010, filed Dec. 19, 2013, and entitled "Personalized Webpage Gifting System," and is a continuation in part of U.S. patent application Ser. No. 13/964,895, filed Aug. 12, 2013, and entitled "Personalized Webpage Gifting System," which is a continuation-in-part of U.S. patent application Ser. No. 13/753,453, filed Jan. 29, 2013, which claims the benefit of the prior filed U.S. Provisional Patent Application Ser. No. 61/592,320, filed Jan. 30, 2012, U.S. Provisional Patent Application Ser. No. 61/698,410, filed Sep. 7, 2012, Ser. No. 61/737,729, filed Dec. 14, 2012, and U.S. Provisional Patent Application Ser. No. 61/737,731, filed Dec. 14, 2012. The contents of each provisional and non-provisional application, listed above are hereby incorporated by reference in their entirety.

FIELD OF INVENTION

This invention relates generally to computing systems, and more particularly, to a personalized webpage gifting system and method.

BACKGROUND

People often use gifts to show sentiment to one another. Examples of gifts may include physical products (e.g., toys, jewelry, hobby enthusiast equipment and materials, etc.), or services (e.g., subscriptions to services, such as magazines, newspapers, or event tickets to entertainment venues, such as movies, concerts, plays, etc.). As a particular example, transaction cards, stored value cards, or gift cards, as they are commonly called based upon their intended use, have become popular gifts. Gift cards typically comprise a stored value card whereby a certain cash equivalent value is encoded upon a magnetic strip applied to the surface of the card. This stored value may be determined by the vendor prior to packaging and display for sale or may be selected at the point of sale by the purchaser and loaded by the cashier using a magnetic card reader/writer. As an alternative to a magnetic strip, a transaction card may use a bar code to link the card to an account by which the associated value is stored in a computer database. Gift cards are typically provided with a generic and impersonal design, typically identifying the associated merchant for which the card may be used to purchase merchandise, and therefore are not personalized in view of the intended recipient. Gift card holders may be used to augment the gift of a transaction card by providing a surface for displaying decorations, images, or messages.

Gift cards are often presented for sale on display racks in stores, each card or packet of cards being hung upon a display stand peg. It is also known to provide a selection of gift cards for purchase online through a commercial webpage. Such webpages may allow an online purchaser to select among gift cards offered by a plurality of vendors, make selections as to monetary value, and direct transmittal of the selected gift card or cards to the address of an intended recipient.

SUMMARY

According to one aspect, a personalized webpage gifting system includes a server in communication with a computing device having a processor to execute an application. Upon execution, the application generates generate a graphical user interface (GUI) to receive recipient information from each of a plurality of participants in which the recipient information user-supplied content associated with a recipient from each of a plurality of participants, and a monetary amount to be contributed towards purchase of a gift for the recipient. The application then combines the user-supplied content of each participant to form a personalized content structure, wherein the application is further executable to facilitate transmission of the gift and the personalized content structure to the recipient.

According to another aspect, a method includes generating a graphical user interface (GUI) to receive recipient information from multiple participants in which the recipient information includes user-supplied content associated with a recipient from each the participants, and a monetary amount to be contributed towards purchase of a gift for the recipient. The method also includes combining the user-supplied content of each participant to form a personalized content structure, and transmitting the gift and the personalized content structure to the recipient.

According to another aspect, a personalized webpage gifting system includes a server in communication with a computing device having a processor to execute an application. Upon execution, the application generates a graphical user interface (GUI) to receive from multiple participants, a monetary amount to be contributed towards purchase of a gift for a recipient, and facilitate transmission of the gift to the recipient. After transmitting the gift to the recipient, the application generates another graphical user interface (GUI) to receive user-supplied content from the recipient in which the user-supplied content includes gratitude information associated with reception of the gift. Using the gratitude information, the application generates a response message from the received content, and transmits the response message to each of the participants.

According to another aspect, a method includes generating a graphical user interface (GUI) to receive from multiple participants, a monetary amount to be contributed towards purchase of a gift for a recipient, and facilitate transmission of the gift to the recipient. After transmitting the gift to the recipient, the method generates another graphical user interface (GUI) to receive user-supplied content from the recipient in which the user-supplied content includes gratitude information associated with reception of the gift. Using the gratitude information, the method generates a response message from the received content, and transmits the response message to each of the participants.

According to another aspect, a personalized webpage gifting system includes a server in communication with a computing device having a processor to execute an application. Upon execution, the application generates a graphical user interface (GUI) to display a dashboard webpage including a plurality of hypertext links to a corresponding plurality of personalized uniform resource locators (URLs), and when one of the personalized URLs is selected, generate another GUI to display a personalized webpage comprising personalized content for a recipient that has been received from a plurality of participants, wherein the personalized content comprises information associated with a gift purchased by the participants for the recipient.

According to another aspect, a method includes generating a graphical user interface (GUI) to display a dashboard webpage including a plurality of hypertext links to a corresponding plurality of personalized uniform resource locators (URLs). When one of the personalized URLs is selected, the method generates another GUI to display a personalized webpage comprising personalized content for a recipient that has been received from a plurality of participants, wherein the personalized content comprises information associated with a gift purchased by the participants for the recipient.

According to another aspect, a personalized webpage gifting system includes a server in communication with a computing device having a processor to execute an application. Upon execution, the application generates a graphical user interface (GUI) for receiving recipient information associated with a recipient from a host. Using the recipient information, the application creates a personal uniform resource locator (URL) based upon at least a portion of the recipient information, and a personalized webpage addressed by the personal uniform resource locator, receives, from the GUI, participant information associated with one or more participants to be invited to contribute to the personalized webpage, generates a participant encouragement message including at least one of user-supplied textual, audio, images, photographic, or video content from the host, and transmits the participant encouragement message to each of the participants.

BRIEF DESCRIPTION OF THE DRAWINGS

FIG. 4 is an example occasion selection screen displayed by the personalized webpage hosting system according to an aspect of the present disclosure.

FIG. 5 is an example gift recipient screen displayed by the personalized webpage hosting system according to the teachings of the present disclosure.

FIG. 6 is an example host information entry screen displayed by the personalized webpage hosting system according to the teachings of the present disclosure.

FIG. 7 an example design selections screen displayed by the personalized webpage hosting system according to the teachings of the present disclosure.

FIG. 8 is an example gift card selection criteria screen displayed by the personalized webpage hosting system according to the teachings of the present disclosure.

FIG. 9 is an example occasion detail criteria screen displayed by the personalized webpage hosting system according to the teachings of the present disclosure.

FIG. 10 is an example celebration video selection criteria screen displayed by the personalized webpage hosting system according to the teachings of the present disclosure.

FIG. 17 illustrates an example host and recipient information entry screen for receiving information associated with the host, and the recipient by the application according to the teachings of the present disclosure.

FIGS. 18A, 18B, and 18C illustrate example gift selection screens that are generated by the personalized webpage hosting system according to the teachings of the present disclosure.

FIG. 20 illustrates an example celebration video entry screen that is generated by the application according to the teachings of the present disclosure.

FIG. 24 illustrates an example miscellaneous information entry screen that is generated by the application according to the teachings of the present disclosure.

DETAILED DESCRIPTION

Figure 1A:
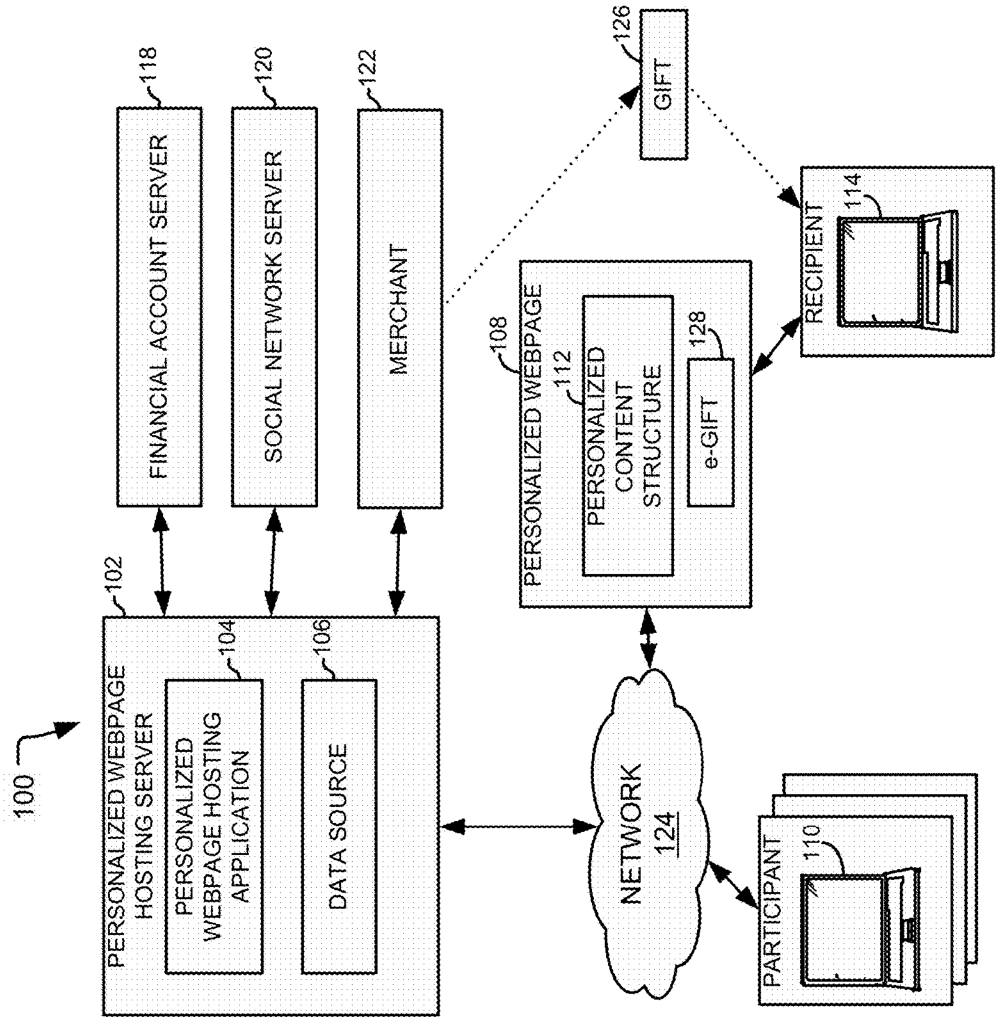
FIG. 1A is a block diagram of a computing system that includes an example personalized webpage hosting system according to an aspect of the present disclosure.

As required, detailed embodiments of the present invention are disclosed herein; however, it is to be understood that the disclosed embodiments are merely examples of the present disclosure, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

A system according to the present invention includes a purchase interface of a system webpage for receiving initial purchase and personalization information from a purchaser. The purchase interface is typically a webpage created using HTML (e.g. HTML5), XML, XHTML, PHP (PHP: Hypertext Preprocessor), JAVASCRIPT™, JAVA™ and/or equivalent programming languages or scripts as generally known in the field of art. A user (i.e. purchaser or organizer) may arrive at the purchase interface via a link (e.g. html link) provided on a third party webpage, such as a third party webpage offering gift cards or other goods or services, or the user may arrive at the purchase interface by directly accessing a system webpage. Certain embodiments or components of the purchase interface may be accessible via a browser, mobile Internet application, or other Internet-accessible software on a personal computer, smart phone, tablet device, electronic game device or other electronic device used for Internet access.

The purchase interface allows the purchaser to select among several themes or occasions such as birthday, anniversary, wedding, congratulations, thank you, back to school, new baby, bridal, graduation, house warming, and including seasonal themes or occasions such as Christmas, Hanukah, Valentine's Day, Easter, Mother's Day, Father's Day, Boss's or Administrative Assistant Day. Selection of a theme or occasion will influence or determine the options offered to the purchaser by the system during the transaction.

The purchaser is prompted to enter information identifying the purchaser and information identifying the recipient. Such information may include name, address, telephone number and email address. If the purchaser uses a device including GPS to access the system, such as mobile telephone, GPS data may be provided by the device to the system as a means of providing purchaser location. Further information entered for the gift recipient may include gender, age, interests, etc. Providing interests to the system may include the purchaser entering or selecting among vendors typically frequented or preferred by the gift recipient. The purchaser is then prompted to select one or more gift cards or other gifting means, select or enter monetary amounts, and provide personalization content, such as photographs or other images, sound or video files, or one or more messages to the recipient.

The purchaser may be presented with a choice to either create a closed celebration or gifting presentation, whereby all selections are determined during the purchase process, or to create an open gifting presentation, whereby the purchaser serves as a celebration organizer, and third parties, and in some embodiments the recipient, may provide subsequent additional content and selections.

The system may provide personalization choices to the purchaser such as whether to deliver a selected gift card or cards to the recipient via a gift card holder selected among pre-designed holders offered for selection, via a holder customized to include purchaser provided text, images, or sound, or via a video gift card holder customized by inclusion of a selected or purchaser-provided video. The video gift card holder can store multiple videos provided by system users which may then be played sequentially. The PURL system allows users to load multiple videos limited in total length only by the storage capacity of the video gift card holder. The system also allows each participant to view storage capacity (presented in video run time) remaining on the video gift card holder. The system will prevent video messages that go beyond that capacity from being uploaded. In certain embodiments of the system, the system assigns a set time limit per participant and will not accept video messages from a participant that exceed that time limit. The system will also allow participants to view video messages uploaded by all participants, typically as a draft compiled video that includes all uploaded content to that point.

An email notification message is generated by the system to the gift recipient and includes a link to a personalized webpage identified by a PURL. The personalized webpage and PURL are both created by the system in response to selections and information provided by the purchaser. Typically, the PURL will incorporate some portion of the recipient's name or other personal identifier. In certain instances the identifier may relate to the name of a company or organization. The personalized webpage may include information provided by the purchaser such as the recipient's name, images, messages to the recipient, and information regarding gifting. Means may be provided for the recipient to add information to the webpage such as a wish list or a message to third parties that view or interact with the webpage. Means may also be provided for third parties, such as friends, relatives, or coworkers to add information for presentation on the webpage or other use by the system, such as details of an event (e.g. birthday party), messages to the recipient, or photos or video clips of an event. Information generated by the system or provided by the system provider may also be presented on the webpage such as information identifying gifting opportunities for a party interacting with the webpage. Information provided by a gift card vendor, or affiliates of the system provider or gift card vendor, may also be provided. For example, offers and advertisements generated by or on behalf of the gift card vendor or affiliate may be displayed.

In order to invite third parties to contribute to the content of the personalized webpage and/or to make gift purchase selections, a link incorporating the PURL associated with the webpage may be sent to third parties via email, text message, social media or similar means. The third party invitation to participate may include graphics and text designed to encourage participation and build excitement. The invitation may be sent well in advance of an alert to the recipient, so that third parties may make contributions and selections to the webpage, as well as gift purchases, prior to presentation of the webpage to the recipient. Alternatively, the recipient may be alerted shortly after creation of the personalized webpage and PURL so that the recipient may also influence content and selections, such as by providing a wish list or other information useful for participants to make gift purchase decisions.

The names of parties who are invited by the organizer to participate in the group gifting occasion, event or celebration, i.e. to become participants, will be listed publically on the PURL page. Those who have contributed a gift will be noted visually to represent their participation. Information received about participant participation from the PURL invitation page will be stored in a relational database (e.g. Oracle, SQL Server, MySQL or other operable databases) and presented for viewing by all invitees. PHP or other operable means is used to collect data from the PURL invitation page and transfer data to the relational database for storage. Data indicating which invitees have participated or have not yet participated may be used to send reminders or notifications (such as reminders for the group gift cut-off date to those who have not yet responded). A participant may recommend another party by adding that party's name and/or email address to a system form for receipt by the system. The recommendation, including any information provided by the recommending participant, is provided by the system to the organizer so that the recommended party may be accepted or rejected by the organizer for acceptance as a participant. Such acceptance or rejection is indicated by the organizer to the system via user interface on a personalized webpage accessible to the organizer. The organizer may accept or reject a recommended party for participation by activating an element (e.g. check box, radio button or other known type of selection element) on the webpage. If a recommended party is accepted, a record corresponding to the party, such a record typically including an email address, is added to the database record for participants. In certain embodiments, a notification may be provided by email or other means to the organizer when a participant recommends another party for participation.

In order to alert the recipient to the personalized webpage, and to provide a link incorporating the PURL associated with the webpage, the system may generate an email, text message, social media message or similar means of communication to the gift recipient. Alternatively, or in conjunction with the recipient alert message, a teaser video may be created using content provided and selected by the purchaser with a link to the teaser video provided in the message. Details associated with the teaser video are described in detail herein below.

The personalized webpage gifting system may provide a celebration video that is accessible via the personalized (PURL-addressed) webpage to extend the celebration for the recipient by communicating a particular sentiment, occasion, or gift card brand experience to the recipient. The generation and use of the celebration video will be discussed in detail herein below As a further alternative that may be used in conjunction with any of the above means of notification, a third party invitation to participate, and/or an alert to the recipient, may be conveyed via social media such as a post to one or more FACEBOOK™ TWITTER™, PINTEREST™, YOUTUBE™, GOOGLE™ or other comparable accounts. System communications with social media networks may be made via network APIs and JavaScript SDKs, for example, using the Facebook SDK to invoke various APIs. It should be appreciated that communications between the system and social media networks may occur by any operable means. In addition to a link to the personalized webpage, these posts may provide additional information related to the recipient and event and provide a means for coordinating activities related to the event.

As an alternative to email or text messages to convey links, QR codes may be provided on gift cards, gift card holders, inserts, backer panels, correspondence, or other physical items conveyed to the gift recipient. These QR codes may be used as an alternative machine-readable method to encode and convey links or other information relative to the system.

A method in accordance with the present invention includes the steps of the gifting system providing a home page explaining the celebration or event to a party who serves as an initial purchaser and, in certain embodiments, an event or celebration organizer. The system interface provides a menu or other selection means for the organizer to select among predetermined occasions. Depending on the occasion type selected, the system interface may provide means for selecting among predetermined themes or designs as well. The system interface comprises a computer program that runs on a computing device such as a personal computer (e.g. desktop, laptop, notebook), server, mobile devices such as a tablet, mobile phone, IPOD™, IPAD™, and similar devices capable of presenting a user interface and networking to other computing devices.

The system interface receives details from the organizer such as the host or organizer's name, telephone number and e-mail address, the guest or recipient's name and e-mail address, an event title, and event date, and a cut-off date for participation. The system interface provides one or more menus or other selection means by which the organizer may specify recipient preferences as to shopping, dining, travel, or other purchase categories. The organizer selects whether or not to add a gift card to the purchase and, if so, whether the gift card will be a group gift card (receiving monetary contributions from multiple participants) or an individual gift card (paid by one party, typically the organizer). The organizer selects a gift card vendor, provides an amount, provides a cutoff date for contributing amounts to the gift card by other participants, and selects whether the gift card is to be a physical gift card for delivery to the recipient via mail or delivery service or an electronic gift card (also referred to an e-gift card or electronic gift card). An electronic gift card is typically embodied as an electronic message that includes a code to a stored value or other redeemable value. An electronic gift card may be send to a recipient by electronic message.

If the organizer selects a physical gift card, the system interface provides means for selecting and/or customizing a gift card holder. The purchaser may be presented with various design options for gift card holders which may be segregated among categories. If a user selects a category (e.g. color, design type, theme or occasion, pre-written message), then designs from that category will be presented for further selection. Typically, thumbnail images of designs are first presented for viewing on a system interface but may be selected by the purchaser to activate presentation of an enlarged view of the selected design.

In certain embodiments, the user uploads a photo or other image via an interface such as a Flash based player interface. The user may upload image files in any system-supported format such as JPG, TIFF, PNG, and BMP formats. The user may also select to choose a file from a social media network, which the system typically facilitates through a connecting API. The uploaded image is stored on the Content Delivery Network server. The image can be positioned by drag and drop, as well as fine-tuned controls for moving left, right, up, down, zoom in, zoom out, and rotating the image in 90 degree increments. The final, positioned image is then placed in a template-based Flash video file. This video file has predetermined placement areas that are marked and tracked within the video file. Uploaded content elements (e.g. text, images) are mapped on the placement areas in the video file. Once images and text are uploaded and mapped to the placement areas, the user can view a preview of the video through the video player. (Video players are typically generated using means such as Flash or HTML5.) The video is then composited and saved as a new video file (e.g. Flash video file) that is set for streaming from the Video Management System, specifically from the content delivery network (e.g. Rackspace or Akamai CDN). The Video Management System typically includes the entire video processing system, from the Flash components to the CDN. The video may be composited using any operable means, which may include a system specific custom compositing engine based on Adobe's Open Source Media Framework Template Flash video files. An email is sent to the recipient with a link to follow to view the final composited video file. The video may be viewed using any operable means, including a system specific, custom video player based on Adobe's Open Source Media Framework. The system may utilize a server such as a Rackspace Content Delivery Network server for storing the uploaded user images and a video server for storage of the template video files and streaming of the final composited video files. Additionally, via SWF to MP4 Conversion Tools, the video file is typically encoded into an MP4 format for optional playback on mobile devices. In certain embodiments, HTML5 is used along with or instead of Flash to play audio and video within webpages and, for example, to construct and play videos provided by the system.

Additional customization options are available if an organizer or participant selects to give an electronic gift card in addition to creation of a celebration video. Certain embodiments of the system provide options for a participant to take any of the following actions through interaction with the system:

1. Record a personal video message to announce the delivery of the gift. A video message is provided to the system either by recording via appropriate hardware and software on a computerized device (e.g. personal computer, laptop, tablet, mobile phone, smart phone, or other computerized device) operable for recording and electronically transferring video to the system, and/or by uploading a video already existing on a computerized device. This video message is typically combined with the video messages of other multiple participants that contribute to produce a video compilation that results in a teaser video or celebration video. Using video compilation tools, such as Flash or JavaScript in the prior art, and/or custom technologies, individual video clips are compiled or merged together to create one common video file. A known video file format includes SWF. Upon compilation of the video, it is stored to a file for consumer consumption, typically to a common, known format such as MP4. The video file is stored on a system server, such as a Content Delivery Network server, for playback to the recipient, organizer, participants, or other viewers. Participants may preview video recorded to-date, i.e. video recorded by prior participants thus far, as well as provide additional video content.

2. Record a personal audio message to announce the delivery of the gift. This audio message can be recorded via the microphone on the user's computer or via a toll free telephone number. Recorded audio is stored on a system server in any operable format and may be incorporated into video, sent to the recipient via electronic message, provided for listening via a link or audio player on the personalized webpage, or stored on an audio chip housed in a gift card holder.

3. Video messages may be presented to the gift recipient for viewing on a personalized webpage, as a video file attached to an electronic message such as email or text message, as a video file accessible through social media, or stored for viewing in a video playback device such as a video greeting card or video gift card holder. Notice of the video message to the gift recipient may be provided via electronic message, social media sites, or by arrival and viewing upon the video playback device. Reveal animation videos may be stored in a similar manner, presented in a similar manner and notice of reveal animation videos may be made in a similar manner as described above for teaser videos.

Audio messages may be presented to the gift recipient for listening on a personalized webpage, as an audio file attached to an electronic message such as email or text message, as an audio file accessible through social media, or stored for listening in an audio playback device such as an audio greeting card or audio gift card holder. Notice of the audio message to the gift recipient may be provided via electronic message, social media sites, or by arrival and viewing upon the audio playback device. In certain embodiments, the recorded audio is stored for playback on a Content Delivery Network server (e.g. Rackspace CDN) to enable access to the audio message online for listening.

The system interface receives payment information from the organizer such as credit card or other electronic payment information, typically utilizing a payment gateway API (e.g. PayPal® or Authorize.Net®) as well as billing and shipping addresses.

The system interface provides means for the organizer to invite other parties to participate in the celebration or event. Invitations may be sent via e-mail address or more generally by posts to social media sites. Based upon content uploaded or otherwise provided by the organizer, the system creates an invitation page displaying the recipient's name, images and text, and means for participants to make purchases and provide additional content. A celebration video, which may be selected by the organizer from pre-produced videos or may be created from a video template using participant content, may also be displayed upon the invitation page. Participants may suggest additional (prospective) participants to be invited by the organizer. The names and email addresses of the suggested participants (invitees) will be sent by the system in an email message to the organizer, alerting the organizer of these suggestions. The organizer may then log into the system to view these suggestions and deploy an invitation through the system to those suggested invitees they wish to invite.

Content provided by participants (participants include the organizer) may include messages entered as text, photographs or other images, and video or audio files. Content limits per participant may be preset by the system or may be determined and set by the organizer. Overall content limits, such as available video or audio file storage (whether calculated in time or bytes) are set by the system and generally determined by physical limitations of audio or video file circuit memory.

Content provided by participants, such as photos, may be uploaded from a participant personal computer or mobile device (IPOD™, IPAD™, mobile phone or similar devices) or may be obtained from social media cites referenced by participants, such as a participant FACEBOOK™ or TWITTER™ account/page, or photo sharing site, such as FLICKR™ or INSTAGRAM™. Video content is typically provided via file upload.

The system interface provides means, such as menus or lists, for participants to select and add a new gift card to the gifts to be provided to the gift recipient under the celebration. Gift card choices presented to the participants may be determined at least partially by information provided by the organizer such as recipient's favorite shopping, dining, and travel venues or providers.

The system may include selection criteria, such as the following, that is used by the system to construct a user profile that is used to select or generate special offers or to provide suggested gift card types or vendors to participants. Such criteria may be associated with the gift recipient and may include event type, age, gender, and geographical location.

EXAMPLE 1

Event=Birthday
Age=14
Gender=Male
Interests=Gaming
Geographical Location=Chicago, Ill.
Coupon Offer=Electronic Arts Coupon for Gaming

EXAMPLE 2

Event=Baby Shower
Age=25
Gender=Female
Geographical Location=Minneapolis, Minn.
Coupon Offer=Enfamil Coupon for Formula

EXAMPLE 3

Event=House Closing
Age=26
Gender=Male
Geographical Location=Austin, Tex.
Coupon Offer=Clorox Coupon for Cleaning Supplies When such criteria is associated with a particular offer or offers, analytics, typically based on user input such as click-throughs, will be tracked and evaluated either via system algorithms or by system personnel for continual improvement of the criteria type and associated values. Selection criteria data is typically stored in a Relational Database (e.g., MySQL, Oracle, etc.). PHP along with SQL is utilized to match special offers with selection criteria.

Following the cut-off date for participation, an email, text, social media message or similar electronic message is transmitted by the system to the recipient notifying the recipient of the celebration. If a text message or other message that typically does not support graphic content is used, a link is provided to a recipient personalized webpage. If an email or similar message capable of displaying graphic content is used, the message may include, in addition text, photos or other images (including images provided by participants) as well as the aforementioned link.

The personalized webpage is created by the system and serves as the main interface for interaction between the recipient and the system as well as a means for the organizer and participant, as well as third party vendors, to display messages and content. Links to e-gift cards or to details and descriptions regarding physical gift cards are typically provided on the personalized event webpage and may comprise graphic elements, such as representations of gift boxes, which the recipient may click on with a computer pointer and mouse (or similar means) to open and view the details and descriptions. Physical gift cards may be shown as drawings or photos and will give the recipient the option to view who the gift was from. Electronic gift cards (also referred to as e-gift cards) are typically presented via animated video. Following the video, e-gift cards may then be printed or sent to a mobile device. In the case of a mobile device, the e-gift card will typically display a code on the mobile device screen that may be used to access and use the e-gift card to make a purchase. The system may present offers on the personalized event webpage from third party vendors such as discounts, coupons, special pricing and other incentives for using gift cards to purchase from certain manufacturers or within certain time spans.

The system interface provides means for the recipient to send thank you notes, either physical or electronic, to participants. In some embodiments, the recipient may customize thank you note content. In certain embodiments of the system, the recipient may record and/or upload a video or audio message for viewing by participants. Links to such videos, typically hosted on a system webpage, may be transmitted to participants via email or text message or similar means, or may be posted on social media sites.

Another embodiment of the invention includes a personalized webpage to facilitate travel-related gifting and sharing photos and travel-related details, such as travel itinerary, with others. The personalized webpage is addressed by a PURL created using user entered information. The PURL and personalized webpage may be created by any of several types of users including a traveler, a friend or relative of a traveler, or someone in the travel industry working with the traveler, such as travel agent booking a trip for the traveler.

The PURL-addressed personalized webpage may comprise a centralized resource for storing and presenting all details pertaining to a traveler's trip and may replace one or more travel confirmation numbers. All trip details may be entered, stored and presented on the personalized webpage for ready access by the traveler and others (participants). In addition, the personalized webpage may present one or more interfaces for participants to contribute monetarily to trip expenses, purchase gifts for the traveler from associated merchants or vendors, purchase hotel upgrades, book dinner reservations, pay for meals and excursion, upgrade airline or other travel tickets, and view and upload content.

The personalized webpage may also provide third party content pertaining to the trip such as flight information, weather information, and touring and activity suggestions. During or after the trip, the traveler may upload content such as text, audio, photos, and video to the personalize webpage for access by the traveler and for the traveler to share with others. In certain embodiments of a travel-related personalized webpage, options for creating online photo albums may be provided as well as options for purchasing photo prints, photo compact discs, and printed photo albums.

Travel-related personalized webpages and associated PURLs may be offered by parties in the travel industry such as travel agencies, cruise lines, airlines, hotels, theme parks, national and state parks, and federal and state tourism agencies. Travel-related personalized webpages and associated PURLs may include themes or otherwise be directed to occasions such as family vacations, honeymoons, anniversary trips, family travel such as for baptisms, and business-related travel.

Embodiments of the present disclosure provide an enhanced online gifting experience that includes a webpage personalized for a gift recipient. A system according to the present invention includes an online interface for a purchaser to enter information identifying a gift recipient, as well as text, sound, images or video relevant to the gift recipient and/or to an event. The system may use portions of this information, or other information provided by a user, to create a personalized webpage identified and located via a personal uniform resource locator (PURL). The personalized webpage is a dynamic webpage that is addressed by the PURL which is created using information provided to the system, typically by an occasion organizer. A gift recipient's name can be utilized by the system when generating (naming) the PURL or the PURL can be custom named by the user. A unique identifier may be included in the PURL to avoid users creating duplicate PURLs.

The personalized webpage provides a means for a purchaser (i.e. organizer or host) to organize a gifting experience pertaining to an occasion or event, and includes options to allow a gift recipient and invited third parties (participants or guests) to add information and make selections on the webpage.

An embodiment of a computer-implemented personalized webpage gifting system may include a purchase interface for receiving data comprising an occasion selection, recipient identifying information, recipient preferences, organizer identifying information, a personalized webpage design selection, a gift card selection, gift card selection criteria, event details, a gift card holder selection, a video selection, payment information, and shipping information. Upon entering typically at least occasion selection, recipient identifying information, organizer identifying information, webpage design selection, and event details, the system creates a purchaser-initiated personalized uniform resource locator addressing a personalized webpage (also generated by the system) for celebrating a recipient occasion and facilitating gifting to the recipient by the purchaser and other participants.

In an embodiment of the system, a user initiating a celebration (also referred to as a purchaser, organizer or host) accesses a system purchase interface of a system user interface of a system webpage or other gifting platform. The organizer may begin organizing the celebration by selecting an occasion or event they wish to celebrate, typically on behalf of a gift recipient (recipient), for example a birthday, wedding or anniversary, or a seasonal celebration such as Christmas, Hanukah, or Valentine's Day. The organizer enters information identifying themselves, such as name and e-mail address, and also enters similar information identifying the recipient. The organizer selects and specifies the gender of the recipient and also enters the recipient's age. Additional information about the recipient, particularly information pertaining to interests and preferences, such as where the recipient likes to shop and where the recipient likes to eat, may also be provided or selected. Such information may be selected from menus or lists of predetermined third party providers or vendors (associated with gift cards or other gifting means) that may be provided by the system. The organizer may also select a gift card from a list of predetermined merchants or vendors, as well as a corresponding dollar amount to associate with the card, as the organizer's own gift to the recipient. The system provides the organizer with information regarding whether or not any of the available gift card vendors are offering specials or discounts to the gift card recipient with the purchase of the gift card.

The organizer selects whether to close out the celebration or keep it open for other participants to add to the amount or select additional gift cards and amounts. (Note that the term "participant" may include the organizer.) The organizer selects how the gift card will be delivered, either physically or electronically/digitally, e.g. by email. Notification of the gift card may be via social media or networks such as FACEBOOK™, TWITTER™, PINTEREST™, INSTAGRAM™, YOUTUBE™, GOOGLE™, or by SMS/Text Message or email. Physical gift cards are typically delivered to the recipient by mail or mail service. Electronic gift cards may be delivered electronically via non-public (private) means such as email or text message or attachments thereto. The system provides the organizer with an option for the personalized webpage to include special offers or coupons from gift card brands, retailers, or manufactures for the gift recipient (PURL recipient) to view and consider. The option will typically be presented as an opt-in box that the organizer may select in order for the gift recipient to see the special offers or coupons made available from manufacturers or retailers at the time of the gift reveal (when the PURL and personalized webpage are presented to the recipient).

The system interface also provides the organizer with a selection of gift card holder personalization options. The options may vary depending on the gift card delivery method, either physical or digital. Personalization options for physical gift cards include selecting among holders that may bear customized images and text, holders that may include stored audio data for playback by audio circuits held within the holder, and holders that include stored video data for playback by video circuits held within the holder and various combinations thereof. Personalization options for electronic gift cards include recording a video or audio message to announce the arrival of the gift card, customizing a celebration video that utilizes the recipient's name, photo and other identifying elements, or selecting an animation video that reveals the gift card to the recipient. If digital delivery of an electronic or electronic gift card is selected, there are additional customization options available such as audio or video messages that allow the sender to announce the delivery or arrival of the electronic gift card as well as animation videos that do the same.

During the process of organizing the gifting experience, the system creates a personalized webpage for the recipient including a PURL typically generated using information specific to the recipient, such as the recipient's name or a portion thereof. The PURL is then used by the system, the organizer or other participants to identify and link to the recipient's personalized webpage created according to the system. Initially, the personalized webpage typically includes a message to participants identifying the recipient and the occasion to be celebrated. Options are provided to participants such as adding dollar amounts to a gift card, selecting a new gift card and amount, adding messages or comments, viewing messages or comments, adding images or videos, viewing images or videos uploaded by participants or generated by the system, or adding other content to be used by the system. Typically, the personalized webpage will include indicia or instructions such as a countdown to the cut-off date, or occasion date, to prompt participants to take action. Such instructions may also be transmitted upon initiation by the organizer or at selected intervals to participants to remind participants to take action.

The organizer may select among various prerecorded video templates stored on a system server to customize a celebration video for extending the gifting experience for the recipient. The celebration video will be presented to the recipient as on or in association with the recipient personalized webpage. Images provided by the organizer or other participants, such as a photo of the recipient (and possibly the organizer), as well as information provided as text, is placed by video generation software associated with the system into predetermined fields within the video template thereby creating a customized video for the recipient. The celebration video is presented on a personalized webpage, or system interface thereof, and links to the personalized webpage may be provided to the recipient, the organizer, and other participants by the system via email or text messages or by postings on social media sites.

In the case of an open celebration, the organizer will typically specify a cut-off date by which any contributions by other participants must be made. Typically, the cut-off date is specified as just prior to the date of the occasion being celebrated. Upon closure of an open celebration, the system will typically display a webpage thanking participants for their participation in the celebration, indicating amounts and types of gifts prepared for the recipient, and displaying content provided by participants and the organizer. A link may also be transmitted via electronic means, such as email or text message, to participants and/or posted on social media sites. The system also creates and displays the finalized recipient personalized webpage including a greeting to the recipient and information such as indications of gifts provided, relevant dates (such as dates by which gifts will arrive in the mail or be transmitted to the recipient), links to the teaser video or other content, and links to content or information provided on social media sites.

The system also provides an option to select creation of an online photo album or scrapbook. The event organizer or others participating in the celebration (collectively referred to as participants) may create an online photo album consisting of any images provided by the participants, including photographs of the gift recipient. The pages of the photo album can be selected from a library of predesigned photo album page templates including predesigned photo layouts and page designs. The photo album functionality typically may be accessed by all participants to view and to upload images. Images may be uploaded from a participant's computer or mobile device (e.g. cell phone, smart phone, pad or tablet) or may be selected from a social media site such as FACEBOOK™, TWITTER™, PINTEREST™, INSTAGRAM™, YOUTUBE™, and GOOGLE™.

The photo album is typically viewable by all participants throughout the event creation process and to the gift recipient as part of the recipient's personalized webpage. The photo album displays the provided or selected photographs or other images and allows a participant who uploads an image to include a brief description, or caption, with the image. Participants may also provide and associate comments with each image in the photo album. The various photos that are added may be sized, moved or repositioned on a photo album page by the participant who is adding the photos and customizing the album page. Photos may also be added, deleted, sized, moved or repositioned by the recipient.

A physical, printed photo album containing the image content (or a selected portion thereof) of the online photo album may be ordered for an additional cost. Printed photo albums are typically made available for ordering once the personalized webpage has been created and provided for access to the gift recipient. The gift recipient or a participant (ordering party) may select from a number of photo album covers and templates to be used with a printed album and may place an order by which the selected images will be printed, compiled and bound into a physical album mailed to the ordering party. In certain embodiments of the system, only the gift recipient may select printed photo album criteria such as images, covers and templates. In such case, participants in the event typically may also order and purchase the album designed by the gift recipient. In other embodiments of the system, any participant may make such selections to create a printed photo album personalized for that participant.

In addition to gift cards, or other gifts generated by the system through input from the organizer and participants, special offers may be provided and presented through the system from third parties such as vendors. Vendors may, for example, offer coupons, discounts or other special incentives for using gift cards by a certain date or for particular types of purchases or for purchases from particular manufacturers.

The system may also provide a selection of thank you cards, typically electronic or e-cards, amongst which the recipient may choose for transmission to one or more participants or groups of participants. Additionally, the system may provide means for the recipient to select among and/or customize a video message to participants. E-cards, video messages or links thereto may all be posted by or through the system to social media sites. The system may also provide means for the recipient to send a physical thank you card that is personalized with photos, sound, text or video and sent to a selected participant, several selected participants, or to all participants.

All Functionality described in the invention can either be provided via standalone ecommerce site or individual components/modules can be embedded in third party retailer sites via industry standard APIs provided by the system provider.

An embodiment of a method of providing a personalized webpage for online gifting may comprise certain of the steps of providing a system interface for receiving an occasion selection and recipient information, generating a personal uniform resource locator based upon a portion of said recipient information, generating a personalized webpage addressed by said personal uniform resource locator, providing a system interface for receiving a first set of identifying information, a gift card selection, a gift card dollar amount selection and a gift card delivery method selection, a second set of identifying information, a closed celebration selection or an open celebration selection, a gift card holder selection, one or more gift card holder personalization option selections, and other personalized content, and providing means for notification of the personalized webpage. The recipient information may include gender, age, location and preferences. The gift card holder may be selected from the group consisting of holders personalized with text, holders personalized with images, holders personalized with audio, and holders personalized with video. The personalized content may be selected from the group consisting of text, image file, audio file, and video file. The means for notification may be selected from the group consisting of text message, email message, electronic message, and social media network.

Figure 1B:
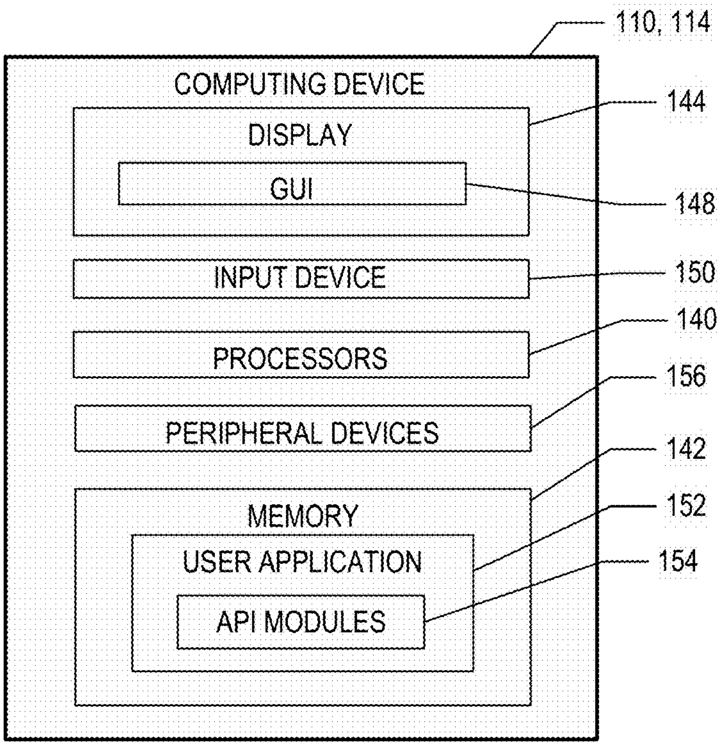
FIG. 1B depicts an embodiment of an example computing device according to one aspect of the present disclosure.
Figure 1C:
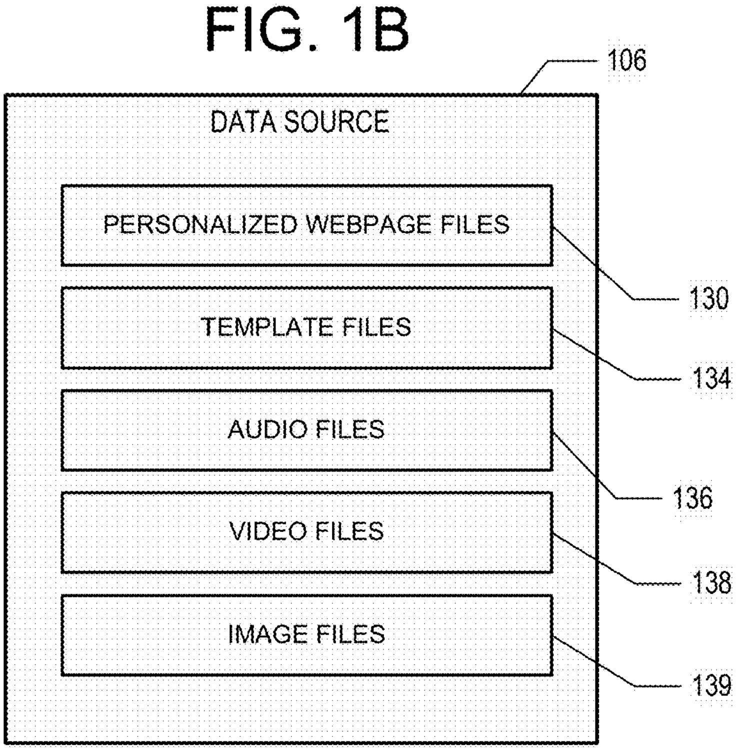
FIG. 1C depicts an embodiment of an example data source according to an aspect of the present disclosure.

FIGS. 1A through 1C depict an example personalized webpage hosting system 100 according to aspects of the disclosure. The system 100 includes a personalized webpage hosting server 102 or other computing device or system that includes a webpage hosting application 104 and a data source 106. As will be described in detail below, the webpage hosting application 102 receives personalized content from computing devices 110 of one or more participants and generates a personalized webpage 108 for display on a computing system 114 of a recipient in which the personalized webpage 108 includes a personalized content structure 112. The application 102 also provides for sending a physical gift 126 to the recipient or an electronic gift (i.e., e-gift) 128 to the recipient as part of the personalized webpage 108.

The personalized content structure 112 generally refers to a multimedia presentation that is combined from individual segments of personalized content provided by the participants. In general, the personalized content structure 112 is provided as a mechanism for imparting a desired sentiment by a group of people (i.e., participants) for the recipient via a collaborative messaging scheme. Examples of such personalized content structures include a scrapbook, a celebration video, and a reveal video, the details of which will be described in detail below.

The server 102 includes a processing system 202 (FIG. 2) that executes the webpage hosting application 104 stored in volatile and/or non-volatile memory 204 (i.e., computer readable media) using the data source 106. Examples of a server 102 include one or more servers, personal computers, mobile computers and/or other mobile devices, and other computing devices. The server 102 may communicate via wireless and/or wireline communications.

The server 102 communicates with a financial account server 188 associated with each of multiple participants to provide payment for the gifts by the participants. The financial account is any type, such as a credit card account, a debit card account, or a PAYPAL™ account of the user. The server 102 facilitates a financial transaction between a server of the merchant 122 and the financial account server 118 associated with the user to provide payment for the gift. The server 102 also communicates with a social network server 120 to obtain information about the participants and/or recipient for suggesting additional content to be included with the personalized webpage. The financial account server 118, the social network server 120, and server of the merchant 122 have one or more processors and executable instructions stored in volatile and/or non-volatile memory for performing the actions and/or steps described herein.

In one embodiment, the server 102 receives personalized information from the computing devices 110 of multiple participants and generates a personalized webpage 108 that includes at least one personalized content structure 112 that is made available for access by a computing device 114 of a recipient. The server 102 also facilitates collaborative gifting by processing monetary contributions by the participants towards the purchase of one or more gifts for the recipient. The gift may be an electronic gift 128, such as an electronic gift card (e-gift card) that is transmitted to a computing device 114 of the recipient as an element of the personalized webpage 108. In another embodiment, the electronic gift may be transmitted to the computing device 114 of the recipient via a messaging service, such as e-mail, a short message service (SMS), or a multimedia message service (MMS), or other suitable digital communication medium. In another embodiment, the gift may be a physical gift 126 that is sent to the recipient via a conventional mail delivery service, such as the UNITED PARCEL SERVICE™.

The server 102 communicates with the social network server 120 to obtain information about the user and/or recipient for suggestions regarding events or any special occasions (e.g., birthdays, anniversaries, weddings, expected graduation dates, and the like) associated with the user and/or recipient. For example, the server 102 may obtain information associated with a friend of the user indicating that the friend has an upcoming anniversary, and present this information to the user along with suggested gifts related to anniversaries so that the participants can optionally select a particular gift to send to the friend (e.g., recipient).

The data source 106 stores personalized webpage files 130, template files 134, pre-recorded audio files 136, pre-recorded video files 138, and pre-recorded image files 139 (i.e., photographs). In other embodiments, the data source 106 stores any suitable type of information for generating the personalized content structures 112 by the participants. The personalized webpage files 130 store information with each personalized webpage and its associated personalized uniform resource locator (PURL). The template files 134 store information associated with structures used to create the personalized content structures. The pre-recorded audio files 136, video files 138, and image files 139 may selected by the host or participant for inclusion as customized content on the personalized webpage 108. Although the data source 106 is shown as being located on, at, or within the local server 102, it is contemplated that the data source 106 can be located remotely from the local server 102 in other aspects of the system 100, such as on, at, or within a database of a data management system or a database of another computing device or system having at least one processor and volatile and/or non-volatile memory.

The communication network 124 can be the Internet, an intranet, or another wired and/or wireless communication network. In one aspect, one or more of the server 102 and the computing devices 110, 112, and 114 communicate with one another using any suitable protocol or messaging scheme. For example, the server 102 and computing devices 110, 112, and 114 may communicate using a Hypertext Transfer Protocol (HTTP), extensible markup language (XML), extensible hypertext markup language (XHTML), or a Wireless Application Protocol (WAP) protocol. Other examples of communication protocols exist. Although the example of FIG. 1A shows the server 102 communicating with the computing devices 110, 112, and 114 through a network, other embodiments contemplate the server 102 communicating directly with the computing devices 110, 112, and 114 without the use of a separate and a distinct network. Additionally, other embodiments contemplate that the modules employed by the server 102 and the computing devices 110, 112, and 114 are integrated in one computing system. Further, the servers 116 through 120 alternatively may communicate with the personalized webpage hosting server 102 via the network.

The personalized webpage hosting application 104 provides a mechanism for transmitting user-supplied content in the form of one or more personalized content structures 112 along with an indication of a physical gift 126 or an electronic gift 128, such as a gift card that is selected by the host and/or one or more participants. The user-supplied content may be included on any suitable medium and may be content generated by the participants (e.g., a video clip generated by a camera of the participants) and/or pre-recorded content 136, 138, and 139 stored in the data source 106 and selected for inclusion on the medium by the participants. FIG. 1B depicts an example embodiment of a computing device 110, 114 of the participants, and recipient according to one aspect of the personalized webpage gifting system 100. The computing device 110, 114 is a computing or processing device that includes one or more processors 140 and memory 142 and is to receive data and/or communications from, and/or transmit data and/or communications to, the server 102 via the communication network 124. For example, the computing device 110, 114 can be a personal computer, such as a laptop or notebook computer, a workstation, or other processing device such as a personal digital assistant or a tablet computer. The computing device 110, 114 includes a display 144, such as a computer monitor, for displaying data and/or a graphical user interface 148. The computing device 110, 114 also includes an input device 150, such as a keyboard or a pointing device (e.g., a mouse, trackball, pen, or touch screen) to enter data into or interact with the graphical user interface 148. In one embodiment, the display 144 comprises a touchscreen device in which input is provided via contact by the participants/recipient with the touchscreen device.

The computing device 110, 114 includes a user application 152 stored in the memory 142 and executed on the processors 140 to generate the graphical user interface (GUI) 148 to the display 104. The graphical user interface 148 enables the computing device 110, 114 of the participants to interact with one or more data entry forms received from the server 102 to enter order data for generating the personalized webpage and/or submitting orders to the application 104. In one embodiment, the user application 152 includes a web browser that displays interactive web pages, applets, or other suitable user interface mechanisms including one or more selectable fields, editing screens, and the like for selecting content and/or modifying pre-recorded content by each participant. In another embodiment, the GUI application 152 includes application software (i.e., a mobile app) that is executed on the computing device 110, which is, for example, a wireless communication device for providing one or more selectable fields, edit screens, and the like for selecting content and/or modifying pre-recorded content by each participant.

According to an aspect of the present disclosure, the user application 152 also includes one or more application program interface (API) modules 154 for communicating with one or more peripheral devices 156 configured in the computing device 110. The API modules 154 include any type that receives user-supplied content from the participants. For example, the API modules 154 include a keyboard for receiving alpha-numeric text information from the user, a microphone for receiving audio content from the participants, and/or a camera for receiving photographic or video content from the participants. As another example, the user application 152 may expose the API modules 154 for use by one or more other systems, such as PAYPAL™, or GOOGLE WALLET™, so that these systems may also communicate with the peripheral devices 156 for receiving user-supplied content from the computing device.

Figure 2:
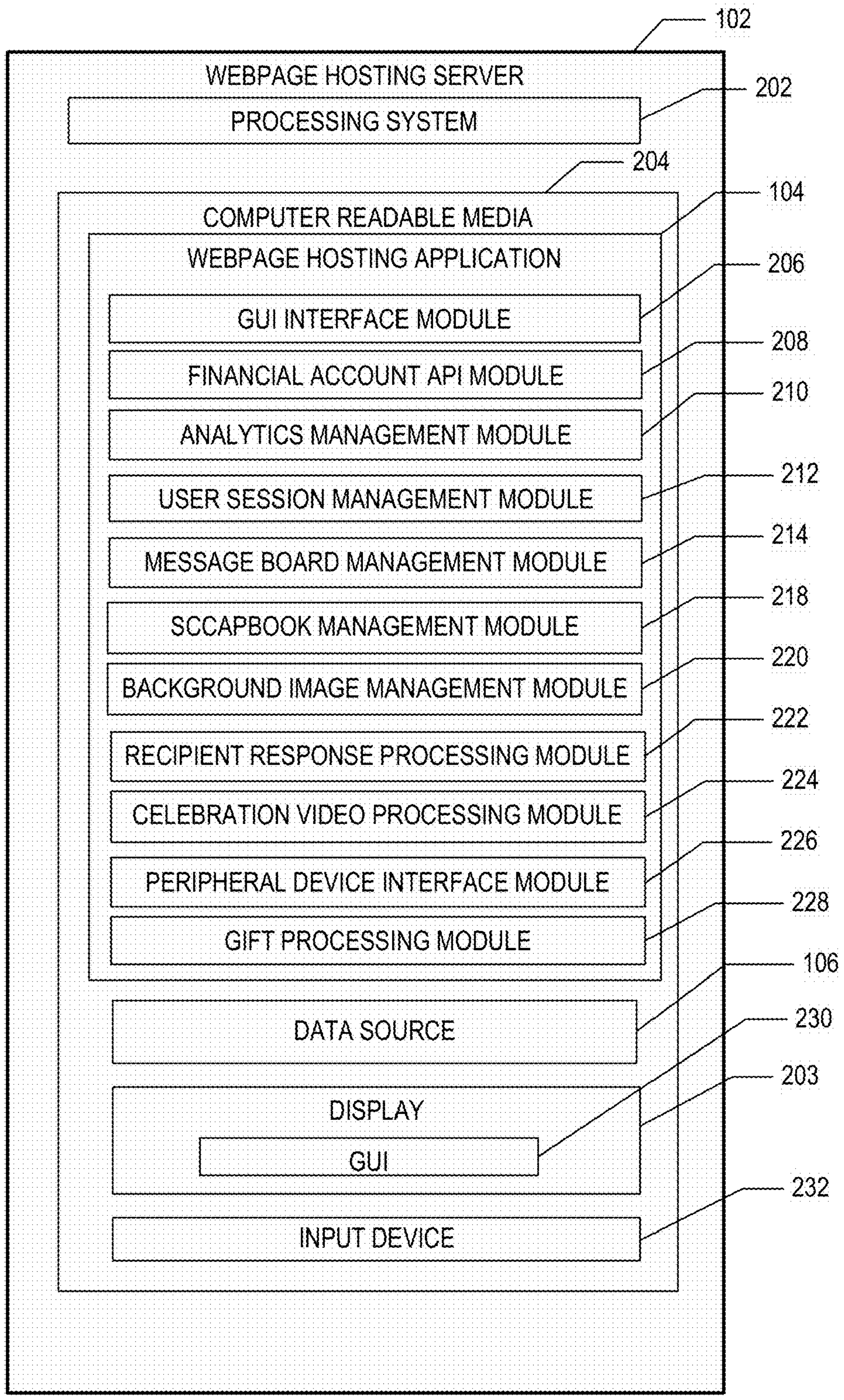
FIG. 2 is a block diagram of a computing system that includes an example personalized webpage hosting application according to an aspect of the present disclosure.

FIG. 2 is a block diagram depicting an example personalized webpage hosting application 104 executing on the personalized webpage hosting server 102. According to one aspect, the personalized webpage hosting server 102 includes a processing system 202 that includes one or more processors or other processing devices. A processor is hardware. The processing system 202 executes the personalized webpage hosting application 104 to generate a GUI on a display of the computing devices 110 of each participant in order to receive customized content for generating the PURL, and for generating a personalized content structure 112 to be sent to a recipient. According to another aspect, the personalized webpage hosting server 102 also includes a display 203, such as a computer monitor, for displaying data and/or a graphical user interface 230. The personalized webpage hosting server 102 may also include an input device 232, such as a keyboard or a pointing device (e.g., a mouse, trackball, pen, or touch screen) to enter data into or interact with the graphical user interface 230.

The personalized webpage hosting server 102 includes a computer readable media 204 on which the personalized webpage hosting application 104 and data source 106 are stored. The personalized webpage hosting application 104 includes instructions or modules that are executable by the processing system 202 to generate the personalized content structures 112. The computer readable media 204 may include volatile media, nonvolatile media, removable media, non-removable media, and/or another available media that can be accessed by the personalized webpage hosting server 102. By way of example and not limitation, computer readable media 204 comprises computer storage media and communication media. Computer storage media includes non-transient storage memory/media, volatile media, nonvolatile media, removable media, and/or non-removable media implemented in a method or technology for storage of information, such as computer/machine readable/executable instructions, data structures, program modules, and/or other data. Communication media may embody computer readable instructions, data structures, program modules, or other data and include an information delivery media or system.

A GUI interface module 206 facilitates the receipt of data and/or other communications from the host computing device 110, the participant computing device 112, and the recipient computing device 114. In one example, GUI interface module 206 communicates with the computing device 110 to generate an interactive display, or other suitable user interface mechanism including one or more selectable fields, editing screens, and the like for receiving instructions and data to generate the personalized content structures 112 on the GUI 148.

A financial account API module 208 communicates with a payment processing server, such as the financial account server 118, to transact a monetary transfer of funds from the financial account of the participants to a financial account of a merchant of the gift(s). For example, the financial account API module 208 communicates with a server of a merchant 122 to facilitate payment for the gift along, and also communicates shipping information to the server of the merchant 122 for sending of the gift(s) to the recipient. If the gift is an electronic gift (i.e., e-gift) 128, the financial account API module 208 communicates with the server of the merchant 122 for processing payment for the gift and optionally activating the gift by the merchant 122.

An analytics management module 210 obtains and manages analytics information that is used for suggesting gifts for the recipient. The analytics management module 210 obtains this analytics information from any suitable source, such as via an analytics engine executed on the webpage hosting server 102 or via a source of analytics information external to the webpage hosting system. The analytics management module 210 may include an analytics API module that provides an interface to a social network to obtain personalized information about the recipients and generate a list of suggested gifts using this personalized information. For example, the analytics management module incorporates an analytics API module that communicates with a social media outlet, such as a FACEBOOK™ social network, to identify friends and obtain personality information about each friend to aid in selecting a gift for a friend.

A user session management module 212 establishes, maintains, and cancels user sessions with each participant that accesses the personalized webpage. The user session management module 212 grants certain rights to add, delete, and/or modify content included in the personalized webpage according to each participant. For example, the user session management module 212 allows addition and/or deletion of certain features, such as the addition of another celebration video or the deletion of an existing, while restricting the participants from performing such procedures. In one embodiment, one of the participants is designated as a host having various administrative rights over the generation of the personalized webpage. For example, a session provided for the host allows certain administrative operations that are restricted from use by either of the participants, recipient, and other (i.e., public) users. Administrative operations allowed by the host session may include, for example, a delivery date that the personalized webpage is to be made available to the recipient, one or more content features to be included in the personalized webpage, an addition or deletion of at least one of the participants.

A message board management module 214 manages the creation and modification of a message board that is included with the PURL website. The message board is included as a portion of the personalized webpage for facilitating communication among the participants. For example, a participant may jot down a comment to another participant that has previously added video content to the celebration video feature of the personalized webpage informing the other participant that the added video content looks great.

A scrapbook management module 216 manages the creation and modification of a scrapbook feature of the personalized webpage. The scrapbook is included as a portion of the personalized webpage, and includes pre-recorded content 136, 138, and/or 139 and/or user-supplied content such as textual, audio, photographic, and/or video content that is supplied by the participants for consumption by the recipient. The scrapbook is formatted in a manner to resemble a physical scrapbook having multiple pages that each commemorates a memorable occasion shared between the participants and the recipient.

A background image management module 220 manages the creation and modification of background image to be included in the PURL webpage. In one embodiment, the background image management module 220 receives multiple elements of pre-recorded and/or user-supplied content from one or more the participants and generates a collage image by combining the multiple elements of content to be used as the background image. For example, the background image management module 220 receives multiple content elements each including some form of sentiment that the contributing participant wishes to convey to the recipient, such as a slogan or pet phrase commonly known by both the participants and recipient, a photograph citing a memorable occasion experienced by the participant and recipient, and a greeting message to convey to the recipient (e.g., Happy Birthday, Happy Easter, Merry Christmas).

A recipient response message processing module 222 manages the creation of a response message to be generated by the recipient after having received and consumed the information and/or gifts 126, 128 included in the PURL webpage. The response message generally includes information, such as that included in a thank you note expressing gratitude for the thoughtfulness shown via the information in the PURL webpage along with the received gifts 126, 128. The recipient response message processing module 222 includes one or more interactive forms and/or windows on the PURL website that is configured to receive textual, photographic, audio, and/or video content from the recipient to be included in the response message. In one embodiment, the recipient response message processing module 222 facilitates the generation of multiple response messages in which each response message include a tag or other identifying information to be sent to different participants based upon information included in the tag. In this manner, the recipient may generate one response message for a first subset of participants and another response message for a second subset of participants.

A celebration video processing module 224 generates a celebration video message to be included with the PURL webpage. The celebration video generally refers to a video clip that is included with the PURL webpage for view by the recipient. The celebration video is typically 10 to 90 seconds in length and includes textual, photographic, images, audio, and/or video content supplied by one or more of the participants. In other embodiments, the celebration video may be shorter than 10 seconds or longer than 90 seconds. The celebration video is accessed using a hypertext link displayed on the PURL webpage that is played on the GUI of the recipient's computing system when selected by the recipient.

In one embodiment, the application 104 generates the celebration video from a template file 134 having a structure for inclusion of user-supplied content by the participants. For example, the video template 134 may include a structure for displaying a title in the form of a text message at the front portion of the template, one or more photographs, and/or one or more video clips that are to be appended contiguously across the extent of the celebration video template 134. The application 104 receives textual, photographic, audio, and/or video content from the participants and renders or composites the content to generate the celebration video to be included with the PURL webpage. In one embodiment, the application 104 may allow the generated celebration video to be shared among social media sites, such as FACEBOOK™, TWITTER™, PINTEREST™, INSTAGRAM™, YOUTUBE™, and GOOGLE™). To select and enable generation of a celebration video, the application 104 displays multiple celebration video templates 134 from which one may be selected by inclusion in the PURL webpage by a participant.

In another embodiment, the application 104 generates the celebration video from a video message supplied by a participant. For example, a participant may wish to generate the celebration video using compositing tools external to the system 100 and upload a fully composited celebration video for inclusion in the PURL webpage using the application 104.

The application provides an option for selection of a celebration video whether an electronic gift or physical gift 126 is selected by the participants. If a physical gift has been selected for physical delivery, the celebration video may be included on a greeting card or other similar gifting platform having a video display and audio generating mechanism for viewing and listening to the customized celebration video segment to enhance the recipient's gifting experience and celebration. If an electronic gift is selected for delivery, a celebration video may be provided for viewing on the PURL webpage as described above.

If a celebration video template 134 is chosen, the application 104 provides for selection of a length of individual video segments that may be used for populating by each participant. For example, the application 104 may display an editable field on the GUI that receives a numerical value indicating the length of time that may be allocated to each video segment contributed by each participant. In this manner, each participant would have the ability to record a brief video message to be compiled with all other individual video messages and presented to the recipient on the personalized webpage as a single sequential video. In certain embodiments, the celebration video may function to make the gift recipient feel special upon viewing the gift(s) 126, 128 at the personalized webpage and to serve as another means to extend the celebration of the special occasion.

A peripheral device interface module 226 provides an interface to one or more peripheral devices of the computing device, such as a global positioning system (GPS) device, a camera, a microphone, and other device configured on the computing system 110. For example, the peripheral interface module 226 uses location information associated with a GPS device to aid in selecting pertinent gift. For example, when vacationing at Grand Canyon, the application 104 uses the peripheral device interface module 222 to select imagery of canyon to include in one of the personalized content structures 112. For another example, the peripheral device interface module 226 receives audio, still imagery, and/or video content using the microphone and/or camera configured on the computing device 110 to include in one of the personalized content structures 112.

A gift processing module 228 facilitates providing the selected gift 126, 128 to the recipient. As mentioned above, the gift may be a physical gift 126 that is sent to the recipient using a standard mail delivery service, and/or an electronic gift 128 that is included as an element in the PURL website. For example, if a physical gift is selected, the gift processing module 228 accesses the financial account API module 208 to process payment for the gift, and communicates with a server of a merchant 122 to coordinate shipment of the selected gift to the recipient. As another example, if a digital gift 128 is selected for the recipient, the gift processing module 228 accesses the financial account API module 208 to process payment for the gift, and communicates with a validation system that manages the digital gift for sending to the recipient. In one embodiment, the digital gift may be an electronic gift card and the validation system is the server managed by the merchant of the gift. Alternatively, the validation system may be a third party activation service, such as INCOMM™, SVS™, and STORE FINANCIAL™ gift card activation services.

It should be appreciated that the modules described herein are provided only as an example of a computing device that may execute the personalized webpage hosting application 104 according to the teachings of the present invention, and that other computing devices may have the same modules, different modules, additional modules, or fewer modules than those described herein. For example, one or more modules as described in FIG. 2 may be combined into a single module. As another example, certain modules described herein may be encoded and executed on other computing devices, such as the computing devices 110 and 114 used by the participants and recipient, respectively. Further, one or more or all of the modules may be stored and executed by the personalized webpage hosting server 102 and data and instructions are transmitted to and from the personalized webpage hosting server 102 and the computing device 103 to execute their functions.

Figure 3A:
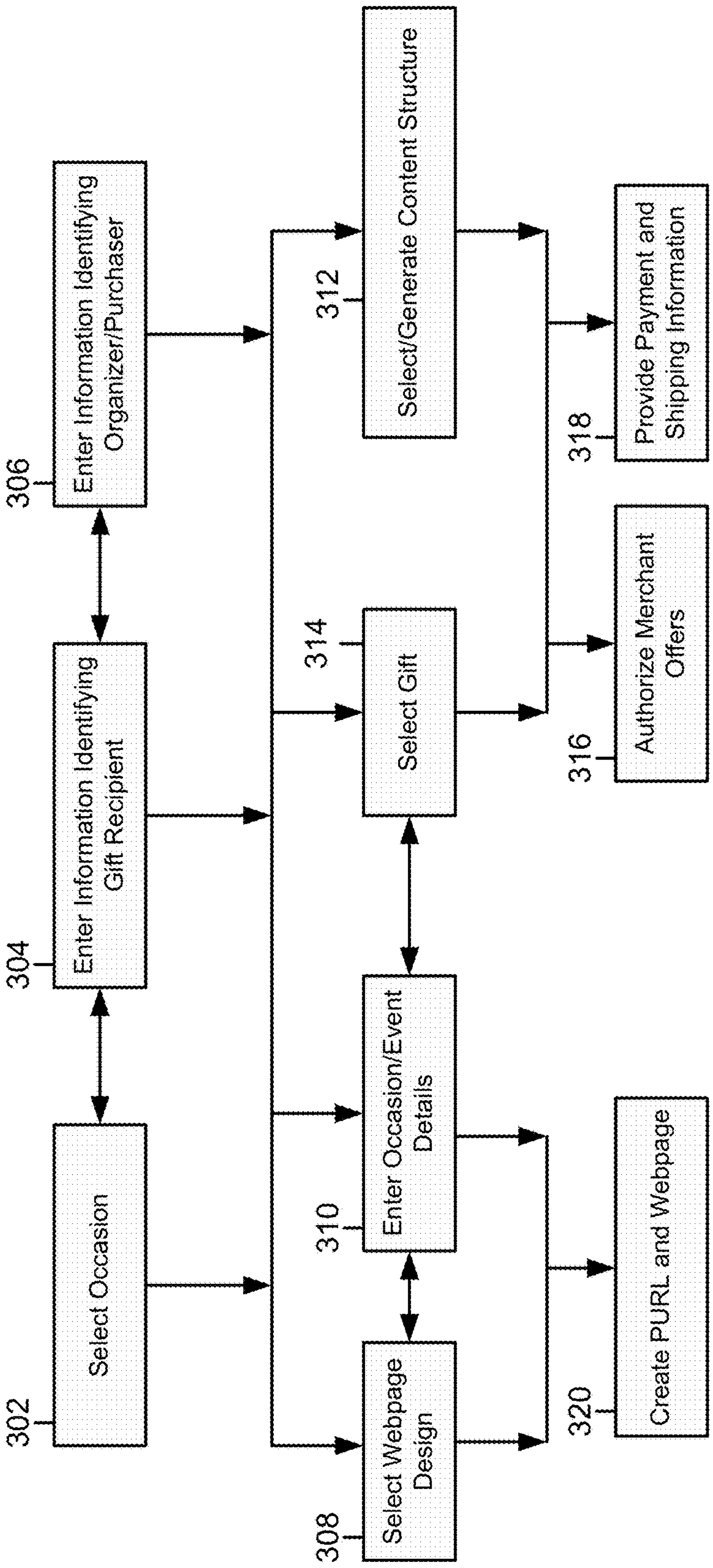
FIG. 3A is a flowchart depicting an example process for creating a personalized webpage and associated personalized uniform resource locator (URL) according to an aspect of the present disclosure.

FIG. 3A illustrates an example process of generating a personalized webpage and associated personalized URL by the application 104 according to the teachings of the present disclosure. Although the example process describes a generic GUI 148 interface for receiving content from a participant (e.g., host) for generating the personalized webpage, the application 104 may generate any suitable interface for receiving information from a host or participant that can be used to create a personalized webpage and associated personalized URL. For example, the interface may be generated as a webpage that is rendered by a web browser executed on the host computing device 110 through a network 124, such as the Internet, or generated by application software (i.e., a mobile app) designed to be executed on a computing device embodied as a wireless communication device, a tablet computer, or other similar type of portable computing device.

In general, the generic interface receives information from one participant functioning as the host. The generic interface receive information, such as selection of an occasion, recipient identifying information, recipient preferences, host identifying information, a personalized webpage design selection, a gift selection, gift selection criteria, event details, a video selection, payment information, and shipping information. Upon receiving the information, the application 104 creates a personalized uniform resource locator (PURL) that addresses a personalized webpage for celebrating an occasion of the recipient and facilitating gifting to the recipient by the host and one or more other participants.

In step 302, the application generates an occasion selection screen (FIG. 4) for receiving a particular occasion to be celebrated with the recipient. Examples of selectable occasions generated by the application 104 include, for example, a birthday, wedding or anniversary, or a seasonal celebration such as Christmas, Hanukah, or Valentine's Day.

In step 304, the application 104 generates a recipient information screen (FIG. 5) for receiving recipient identifying information associated with the recipient. As shown, the recipient information screen may also provide an interface for entering certain interests and/or preferences known about the recipient by the host. These interests/preferences are used by the application 104 to generate suggested content and/or gift cards that may be added to the personalized webpage.

For example, the application 104 may prompt the host to enter information identifying the host and information identifying the recipient. Such information may include name, address, telephone number and email address. If the host uses a device including GPS to access the system, such as mobile telephone, GPS data may be provided by the device to the system as a means of providing the host's location. Further information entered for the gift recipient may include gender, age, interests, and the like. Providing interests to the application 104 may include entering or selecting, by the host, vendors typically frequented or preferred by the recipient. The purchaser is then prompted to select one or more gifts or other gifting means, select or enter monetary amounts, and provide personalization content, such as photographs or other images, sound or video files, or one or more messages to the recipient.

In one embodiment, the application 104 presents the host with a choice to either create a closed webpage wherein all selections are made by the host, or to create an open webpage wherein the host serves as an organizer, and participants, and in some embodiments the recipient, may provide additional content and selections.

In step 306, the application 104 generates a host information screen (FIG. 6) for receiving information associated with the host. In step 308, the application 104 generates a webpage design screen (FIG. 7) for receiving information associated with a particular design of the personalized webpage. For example, if the application receives Christmas as an occasion selection, the webpage design screen may include selectable themes, such as a manger design theme, a wise men design theme, and a Christmas tree design theme that may be selected by the host.

In step 310, the application 104 generates an occasion/event details screen (FIG. 9) for receiving one or more details to be associated with the personalized webpage. For example, the application 104 may, via the event details screen, receive a title to be associated with the personalized webpage, a date of the event, and a participant cut-off date. The event date is the date at which the personalized webpage is made available to the recipient, while the participant cut-off date refers to a point in time in which no further content is allowed to be added to the personalized webpage so that it may be finalized for sending to the recipient. In one embodiment, the application 104 displays a counter indicating a period of time period remaining before the cut-off date arrives. In step 312, the application 104 generates a personalized content structure 112 using user-supplied content provided by the host and/or one or more participants. For example, the application 104 generates a celebration video entry screen (FIG. 10) to receive information associated with a celebration video to be added to the personalized webpage. Information about the celebration video will be described in detail herein below.

Figure 11:
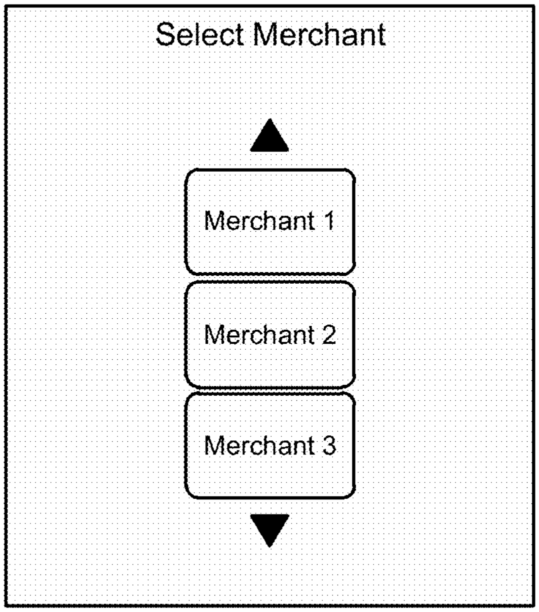
FIG. 11 is an example merchant selection screen for receiving merchant selection criteria from the participant according to the teachings of the present disclosure.
Figure 12:
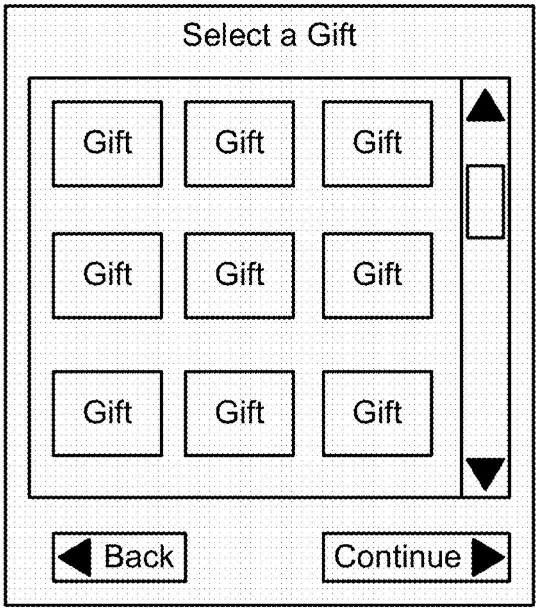
FIG. 12 is an example gift selection screen for receiving information associated with a selected gift by the application according to the teachings of the present disclosure.

In step 314, the application 104 receives information associated with a gift to be purchased for the recipient. To accomplish this, the application 104 generates a merchant selection screen (FIG. 11) for receiving information associated with a particular merchant of the gift and a gift selection screen (FIG. 12) that is displayed once the selected merchant is received by the application 104 to receive selection of a gift from the host. Prior selection of a merchant by the system may enable the user to filter from among all available gifts based upon products commonly provided the selected merchant. For example, a particular merchant known for providing computer-based products may be selected for narrowing the gamut of available gifts to those that include and/or support computer-based products that the host believes will be appreciated by the recipient. Nevertheless in other embodiments, any suitable type of filtering mechanism may be used for filtering and/or narrowing the type of gifts available for purchase by the application 104.

The gift selected via the gift selection screen (FIG. 12) may include any product and/or service having value that may be gifted from the one or more participants to the recipient. For example, the gift may be a physical gift processed by a server of the merchant and sent to the recipient using a suitable mail delivery service. As another example, the gift is an electronic gift, such as an electronic gift card, that is included in the personalized webpage. As yet another example, the gift may be a subscription to a product (e.g., a magazine subscription, a newspaper subscription, an online music subscription, etc.) or a service (e.g., a cellular phone service, a pet grooming service, an automobile maintenance service, etc.). As yet another example, the gift may include one or more tickets to events (e.g., a sporting match, a museum, a zoo, an amusement park, a concert, or an acting play), or other voucher means (e.g., bus tickets, airline tickets, train tickets, etc.).

Once gift information is received, the application 104 receives authorization for additional offers from the merchant to be presented to the recipient in step 316. That is, the application 104 provides the host with an option for the personalized webpage to include special offers or coupons from gift card brands, retailers, or manufactures for the recipient to view and consider. In one embodiment, this option will be presented as an opt-in box that the host may select in order for the recipient to see the special offers or coupons made available from the merchant when the recipient views the personalized webpage.

In step 318, the application 104, processes payment for the selected gift. The application 104 may receive payment in any suitable manner. For example, the application 104 processes payment for the gift by communicating with a financial account server that manages a financial account (e.g., a credit card account) of the host who purchases the gift for the recipient.

In step 320, the application 104 generates the PURL and associated personalized webpage using information provided by the host. The application 104 generates a uniform resource locator (URL) to uniquely identity or associate the recipient with the personalized webpage. In one embodiment, the personal uniform resource locator (PURL) will typically take the following form: http://<party name or other selected personal identifier>.<domain name (typically the name or identifier of the owner of the domain)>.<com, net, biz, org or other top level domain>. In other embodiments, any uniquely identifying format may be used. The generated PURL may be used as a means for providing a customized or personalized web address without creating a separate domain.

Figure 3B:
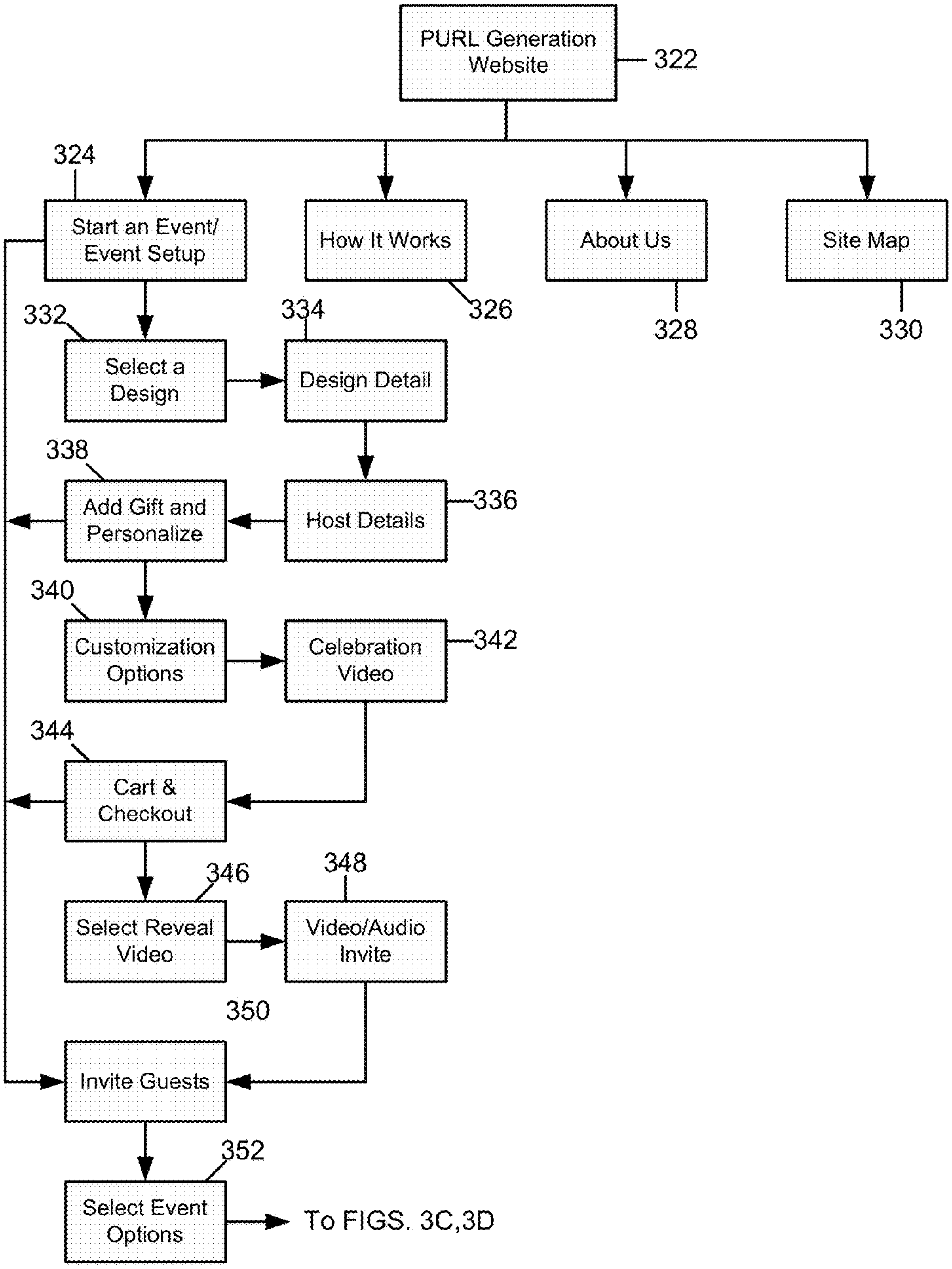
FIG. 3B is a flowchart depicting another example process for creating a personalized webpage and associated personalized URL according to the teachings of the present disclosure.

FIG. 3B illustrates another example process of a PURL management website that is generated by the application 104 for generated the PURL and associated personalized webpage according to the teachings of the present disclosure.

In step 322, the application 104 generates a splash screen (FIG. 13) representing a home page of the PURL management website. The splash screen provides for user initiation of a particular personalized webpage (step 324), navigating to a help page (step 326), navigating to an information screen describing the administrators of the PURL management website (step 328), and/or navigating to a site map page that outlines describing the various webpages that make up the PURL management website (step 330).

Figure 14:
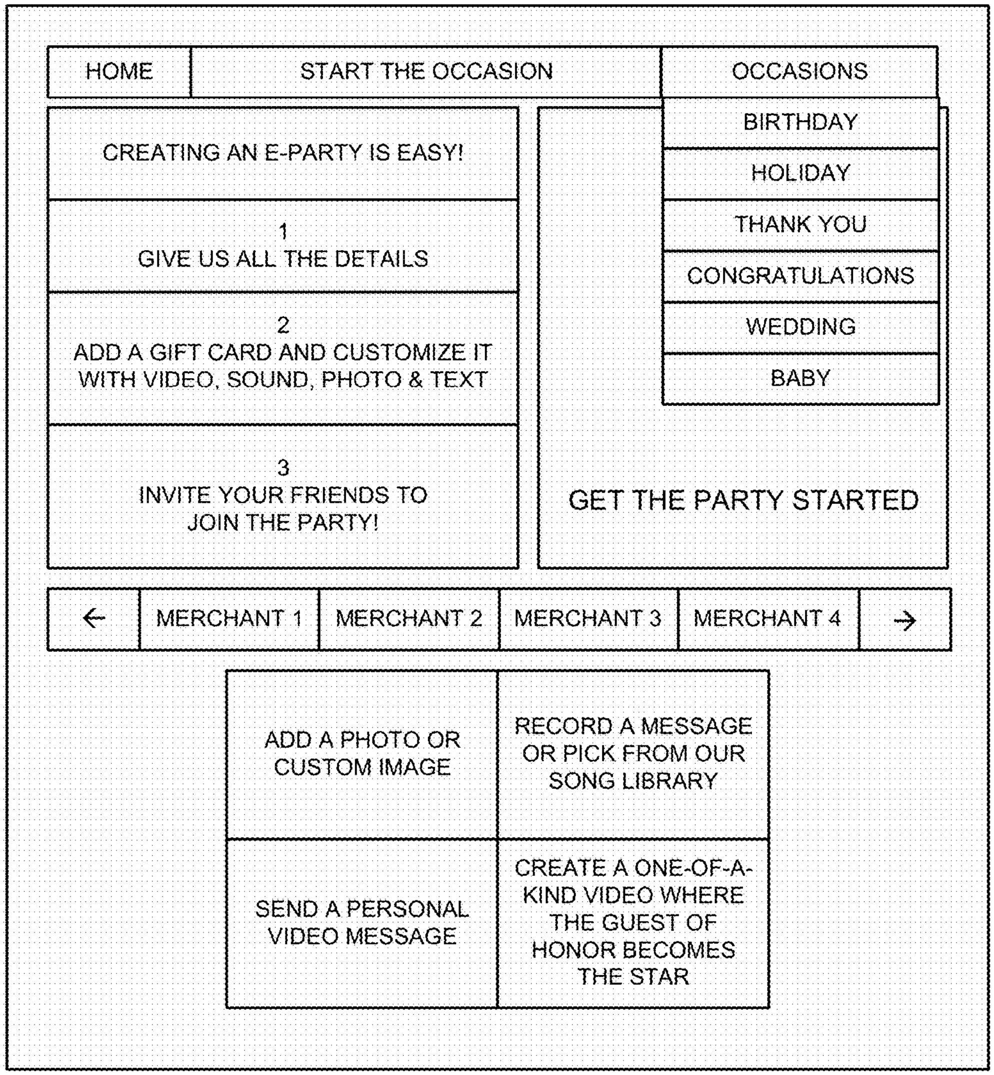
FIG. 14 illustrates an example drop-down list of the splash screen that is generated by the personalized webpage hosting system according to the teachings of the present disclosure.

In step 324, the application begins generation of the PURL and personalized webpage by receiving from the participant (e.g., host), selection of an occasion or event for the recipient, typically on behalf of the recipient. In response to the host initiating a particular personalized webpage, the application 104 generates a drop-down list (FIG. 14) showing the various occasions that the personalized webpage may be generated for in step 332. As shown, the list includes a birthday occasion, a holiday occasion, a thank you occasion, a congratulations occasion, a wedding occasion, and a baby occasion, but any type of occasion may be included in the list. For example, the list may include other occasions, such as an anniversary occasion, or a seasonal occasion such as Christmas, Hanukah, or Valentine's Day.

Figure 15:
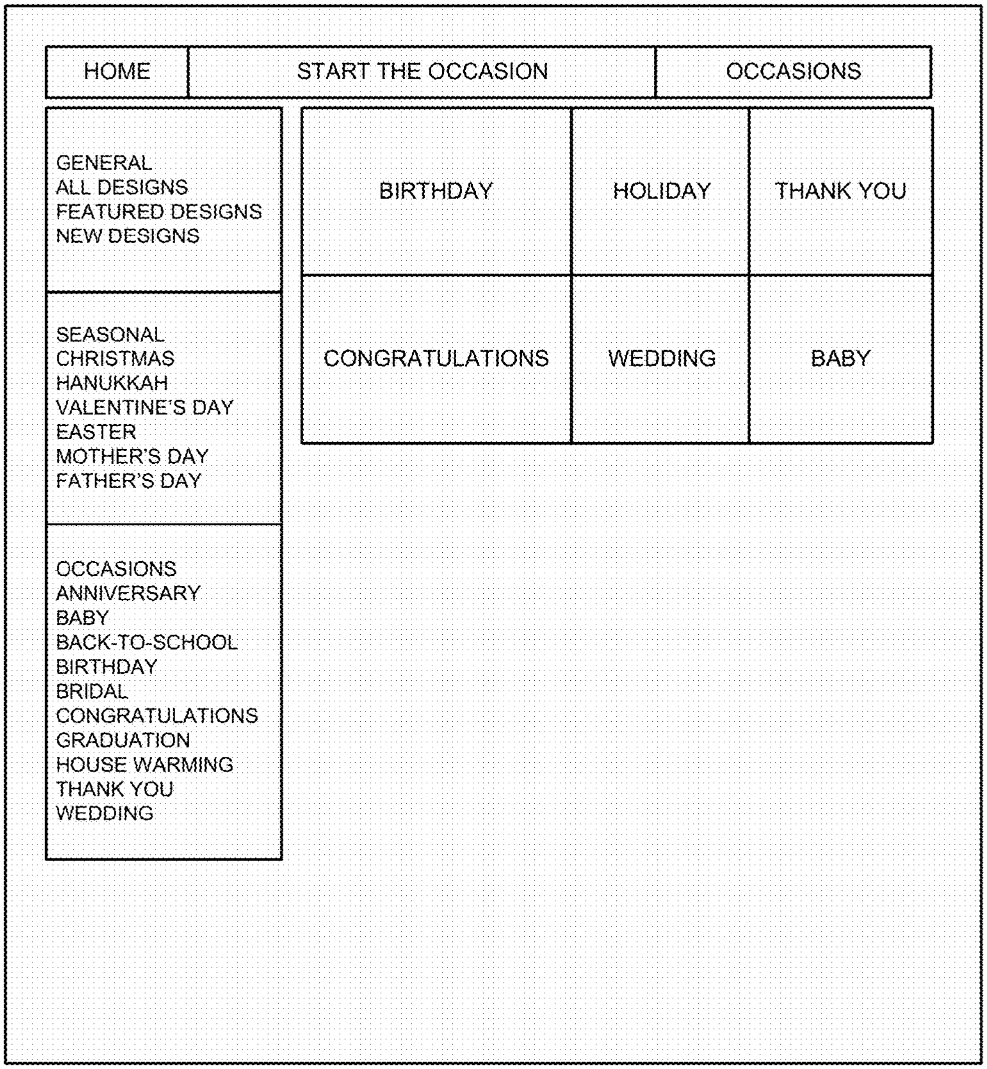
FIG. 15 illustrates an example detailed occasion screen that is generated by the personalized webpage hosting system according to the teachings of the present disclosure.

In step 332, the application receives selection of a design from the host. For example, the application displays a design selection screen (FIG. 15) that allows the host to select from any one of a number of occasions from which the theme of the PURL may be based upon.

Figure 16:
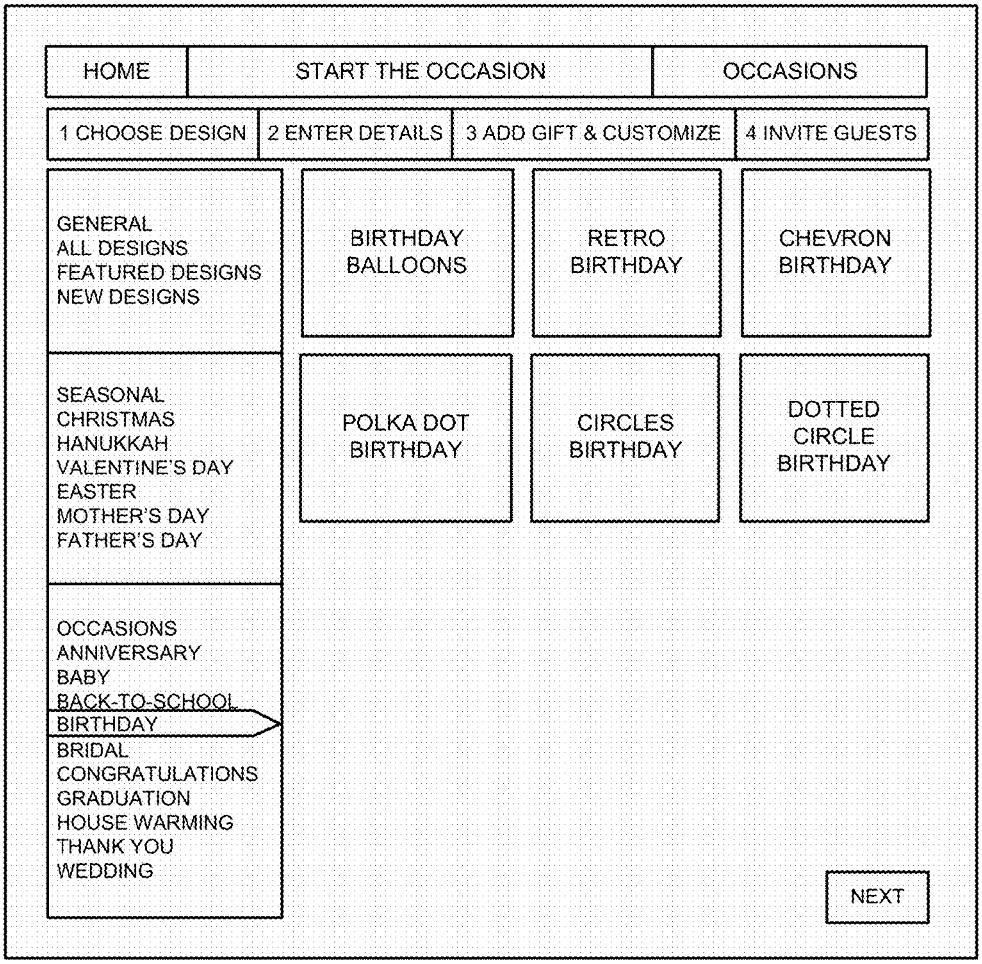
FIG. 16 illustrates another example detailed occasion screen that is generated by the personalized webpage hosting system according to the teachings of the present disclosure.

After receiving selection of at least one occasion from which to base the design upon, the application displays a detailed occasion screen (FIG. 16) showing a detailed view of the occasions for which the personalized webpage may be generated for in step 334. When a particular occasion is received from the host, the application 104 displays a "next" button for the host to continue to step 336.

In step 336, the application 104 generates a host and recipient information entry screen (FIG. 17) for receiving information associated with the host, and the recipient. The application 104 also receives identifying information associated with the host, such as name and e-mail address, and information identifying the recipient, such as the gender of the recipient and the recipient's age. Additional information about the recipient, particularly information pertaining to interests and preferences, such as where the recipient likes to shop and where the recipient likes to eat, may also be provided or selected. Such information may be selected from menus or lists of predetermined third party providers or vendors (associated with gift cards or other gifting means) that may be provided by the system. Additionally, the application 104 may be receive, via the host and recipient information entry screen, information associated with personal preferences associated with the recipient that the application 104 may use to create suggested gift cards that may be purchased by the host and/or participants.

Figure 13:
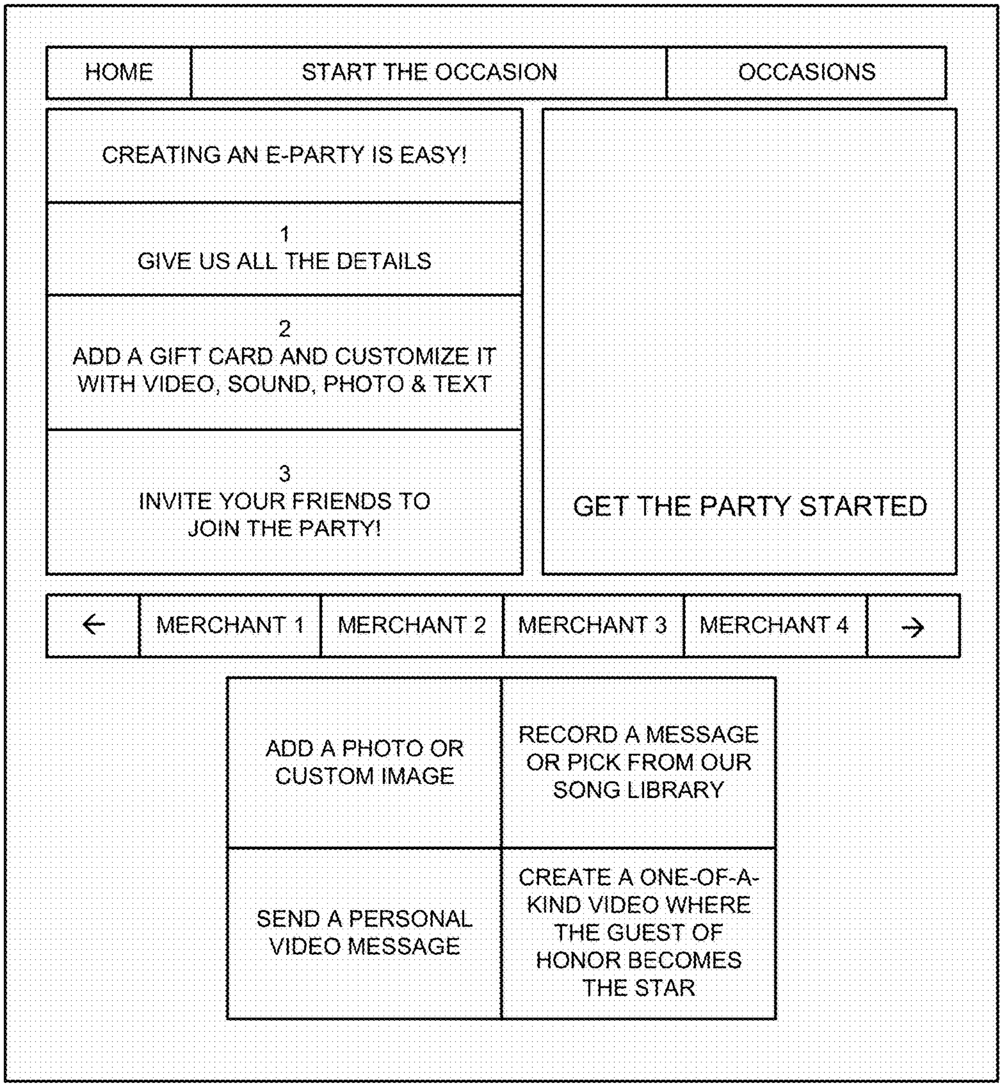
FIG. 13 illustrates an example splash screen that is generated by the personalized webpage hosting system according to the teachings of the present disclosure.
Figure 18B:
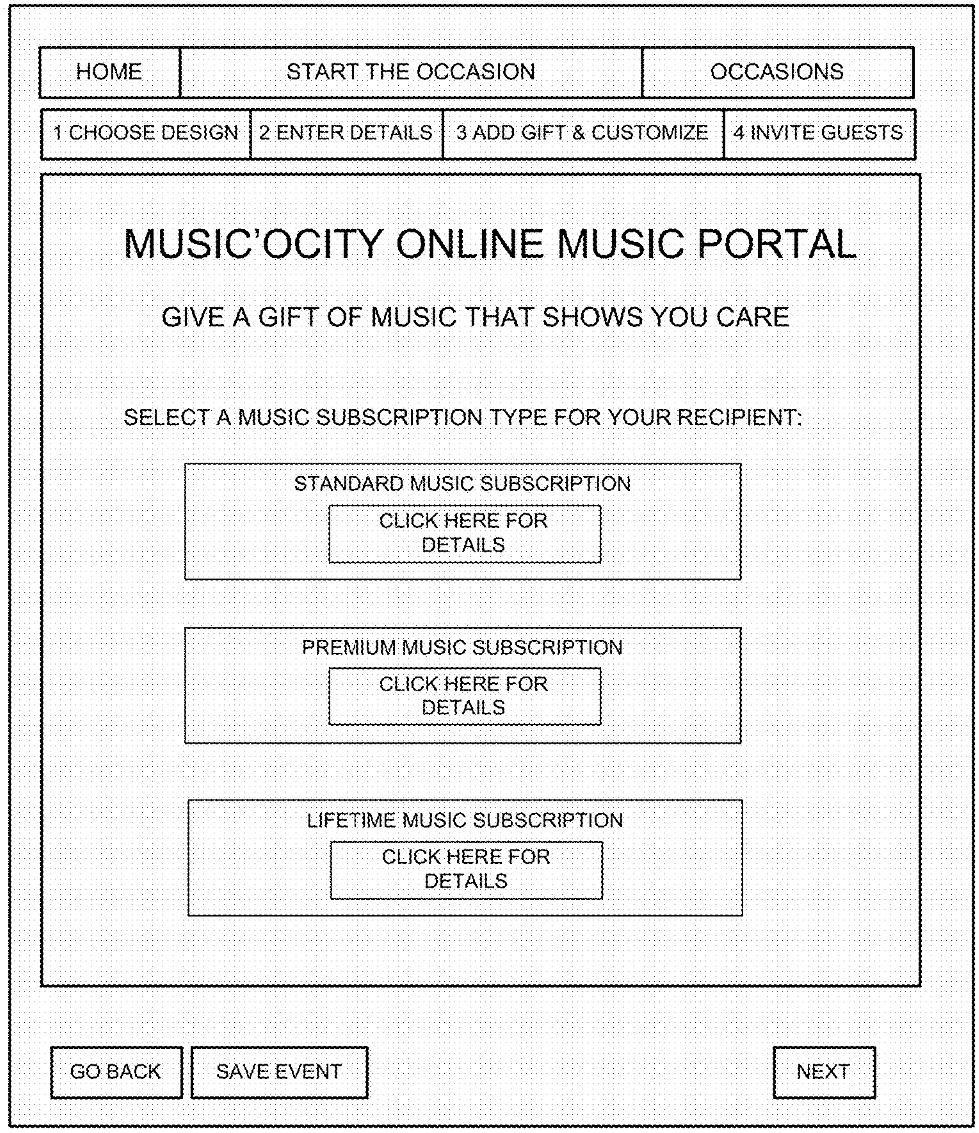

In step 338, the application 104 generates one or more gift selection screens for receiving selection of one or more gifts. At this point, the application 104 receives instructions from the host and/or one or more participants for entry of a selected gift, which may include a product or service in physical form or electronic form. For example, the application 104 may generate a gift card selection screen (FIG. 18A) from which a gift card may be selected by the host and/or a participant. As shown, the gift selection screen includes a window for selection of an electronic or physical gift card to be purchased for the recipient. Nevertheless, the system may provide for the purchase of any type of gift (i.e., physical gift or electronic gift) for the recipient. For example, the application 104 may display a gift selection screen as shown in FIG. 13 that allows selection of one or more physical gifts to be sent to the recipient via a server of the merchant 122. The application 104 allows the host and/or the recipient to select how the gift will be delivered, either physically or digitally. If the gift is a physical gift, it may be delivered using a conventional mail delivery service. However, if the gift is an electronic gift, it may be included as a feature of the personalized webpage.

Figure 18C:
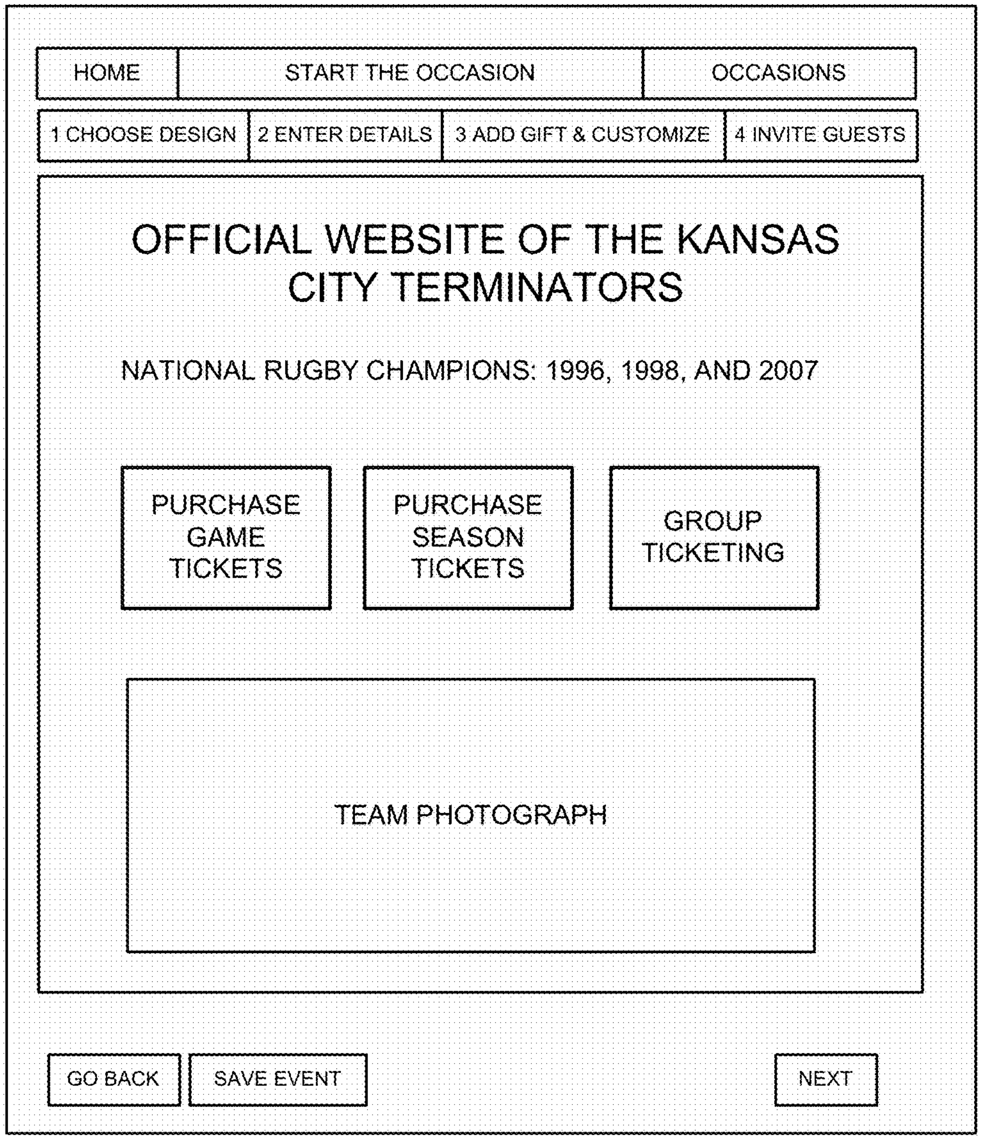
Figure 19:
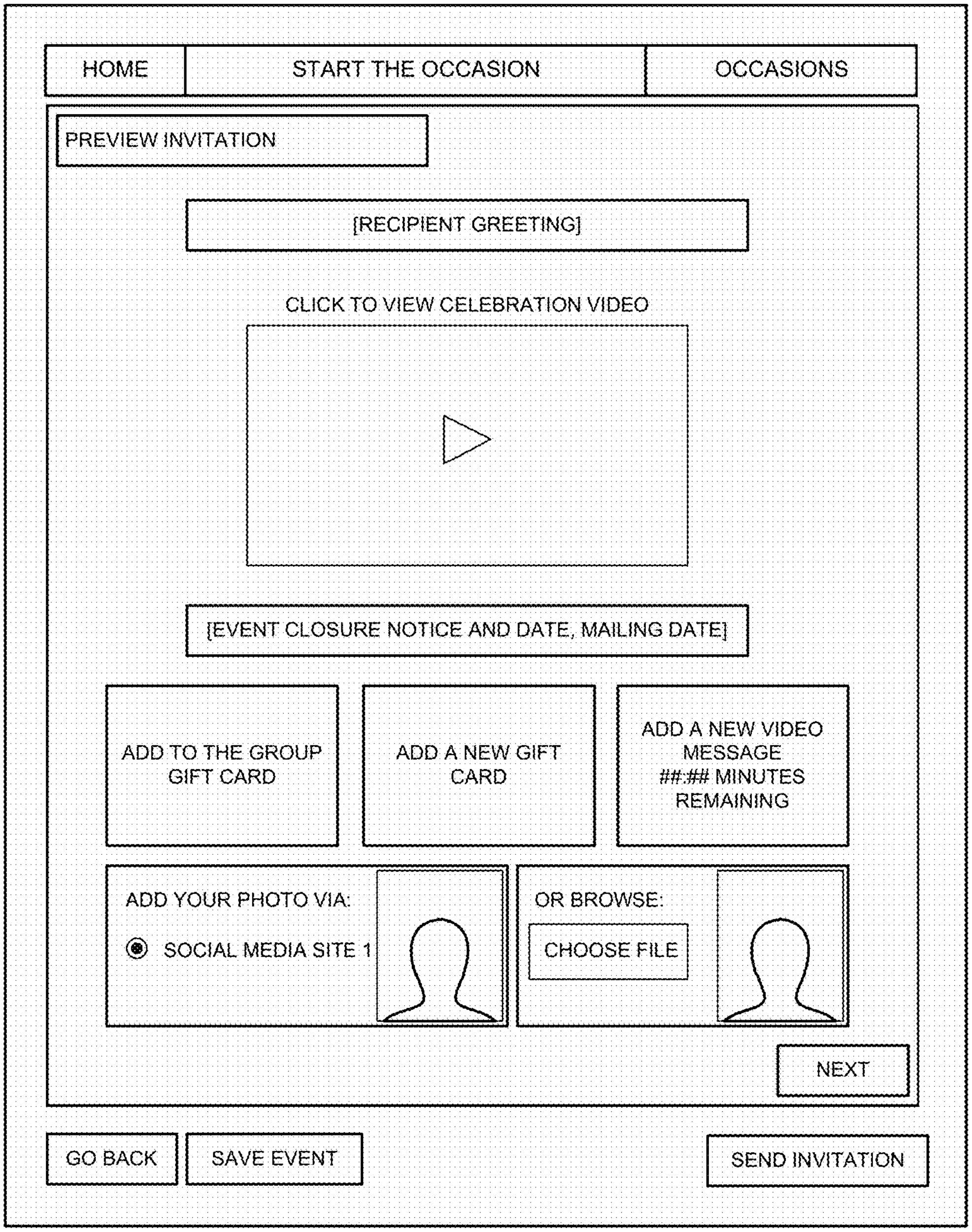
FIG. 19 illustrates an example gift card customization screen that is generated by the personalized webpage hosting system according to the teachings of the present disclosure.

In one embodiment, the application 104 may access all or a portion of a website of a merchant and display of the merchant website for facilitating purchase of a product or service from the merchant by the host and/or participant to be included as a gift for the recipient. For example, the application 104 may generate a merchant website interface screen (FIG. 18B) in which the website of a merchant, which is in this particular case is an online music subscription service, is included as a portion of the merchant website interface screen for conducting a transaction between the host or participant and the merchant for purchasing the music subscription. Although the merchant website interface screen shown herein is directed to a merchant providing a music subscription service, it should be understood that merchants providing other types of products or services may be implemented in a similar manner. For example, the application 104 may also generate another merchant website interface screen (FIG. 18C) that includes a portion of a sports team website for conducting a transaction for purchasing event tickets to their sporting matches.

In step 340, the application 104 provides one or more customization options to be included in the PURL website. For example, the application 104 may provide for entry and/or generation of a teaser video to be sent in advance of notification of the PURL website to the recipient. In one embodiment, the teaser video may be generated from user-supplied content (e.g., textual, audio, photographic, and/or video content) that is transmitted at any suitable time, such as prior to receipt of the PURL by the recipient. Additional details related to generating a teaser video to be sent to the recipient are described in U.S. Patent Application Ser. No. 61/845,731, filed Jul. 12, 2013, and entitled "Personalized Customer Messaging Platform," which is hereby incorporated herein by reference in its entirety.

As another example, the application 104 generates a celebration video entry screen (FIG. 20) in step 342 that provides for entry of textual, audio, photographic, and/or video content by the host and/or the participants. The entered content is combined by the application 104 to form a single video montage representing a sentiment that the host and/or guests wish to convey to the recipient. For example, the celebration video . . . .

The celebration video is generally a video file which may be provided on the personalized webpage to communicate a particular sentiment, occasion, or gifting experience for the recipient. The celebration video is typically personalized by uploading content, such as the recipient's photo to the system. Text content can be added to certain customizable text fields such as the recipient's name and the occasion or sentiment. Upon uploading personalized content, the application then renders or composites the video to include the personalized content. In one embodiment, the recipient is able to share the celebration video via social media channels by sharing a video URL associated with the celebration video with social networks, such as FACEBOOK™, TWITTER™, PINTEREST™, INSTAGRAM™, YOUTUBE™, and GOOGLE™.

To select and enable generation of a celebration video, the application 104 displays several video templates, and receives selection of at least one video template from the list that may be viewed on or from the GUI 148 of the host computing device 110 or participant computing device 112. The application 104 then uploads a photograph, such as a photograph of the recipient and/or a photograph of the host, receives entry of the recipient's name in a text box, and/or receives selection of an appropriate occasion or sentiment from among several provided by the system. In some embodiments, additional text fields may be provided to receive additional text or photographic information from the host and/or participant. The application 104 renders the received content into the celebration video based on predefined fields within the video template thereby creating an augmented reality experience for the recipient.

To generate the celebration video, any type of user-supplied content may be entered by the host and/or participants. For example, the user can upload a photo or other image via an interface such as a Flash based player interface to the application 104. The user may upload image files in any supported format such as JPG, TIFF, PNG, and BMP formats. The uploaded image is stored on the data storage 110. The application 104 provides for positioning of the image by dragging and dropping the image to a selected portion of the screen, as well as fine-tuning controls for moving the image left, right, up, or down as well as zooming in, zooming out, and rotating the image in any desired orientation. The final, positioned image is then placed in celebration video file. The celebration video file has predetermined placement areas that are marked and tracked within the celebration video file. Uploaded content elements (e.g. text, images) are mapped on the placement areas in the video file. Once image and text information are uploaded and mapped to the placement areas, the host and/or participants can view a preview of the celebration video through a video player.

The celebration video is then composited and saved as a new celebration video file (e.g. Flash video file) that is set for streaming from a content delivery network or content distribution network (CDN), such as RACKSPACE™ or AKAMAI™. The content delivery network typically manages most or all content of the celebration video file. The celebration video may be composited using any suitable means, which may include a system specific custom compositing engine based on Adobe's Open Source Media Framework Template™ flash video files.

The personalized webpage includes a hypertext link to access the final composited celebration video file by the content delivery network. The celebration video may be viewed using any suitable means, including a system specific, custom video player based on Adobe's Open Source Media Framework™. The system may utilize a server such as a Rackspace Content Delivery Network™ server for storing the uploaded user-supplied images and a video server for storage of the template video files and streaming of the final composited celebration video files. Additionally, using format conversion tools (e., SWF to MP4 conversion tools), the celebration video file may be encoded into an MP4 format for optional playback on mobile devices. In certain embodiments, the celebration video may be formatted according to an HTML5 format to play audio and video within webpages and, for example, to construct and play celebration videos provided by the system.

In step 344, the application 104 generates a payment screen (FIG. 20) for entry by the participants for payment of the gifts and/or customizations options previously selected. For example, the application 104 may receive account information associated with the host or a guest and facilitate payment for the gift(s) and/or customization options by communicating with the financial account server 118 associated with the host or guest.

Figure 21:
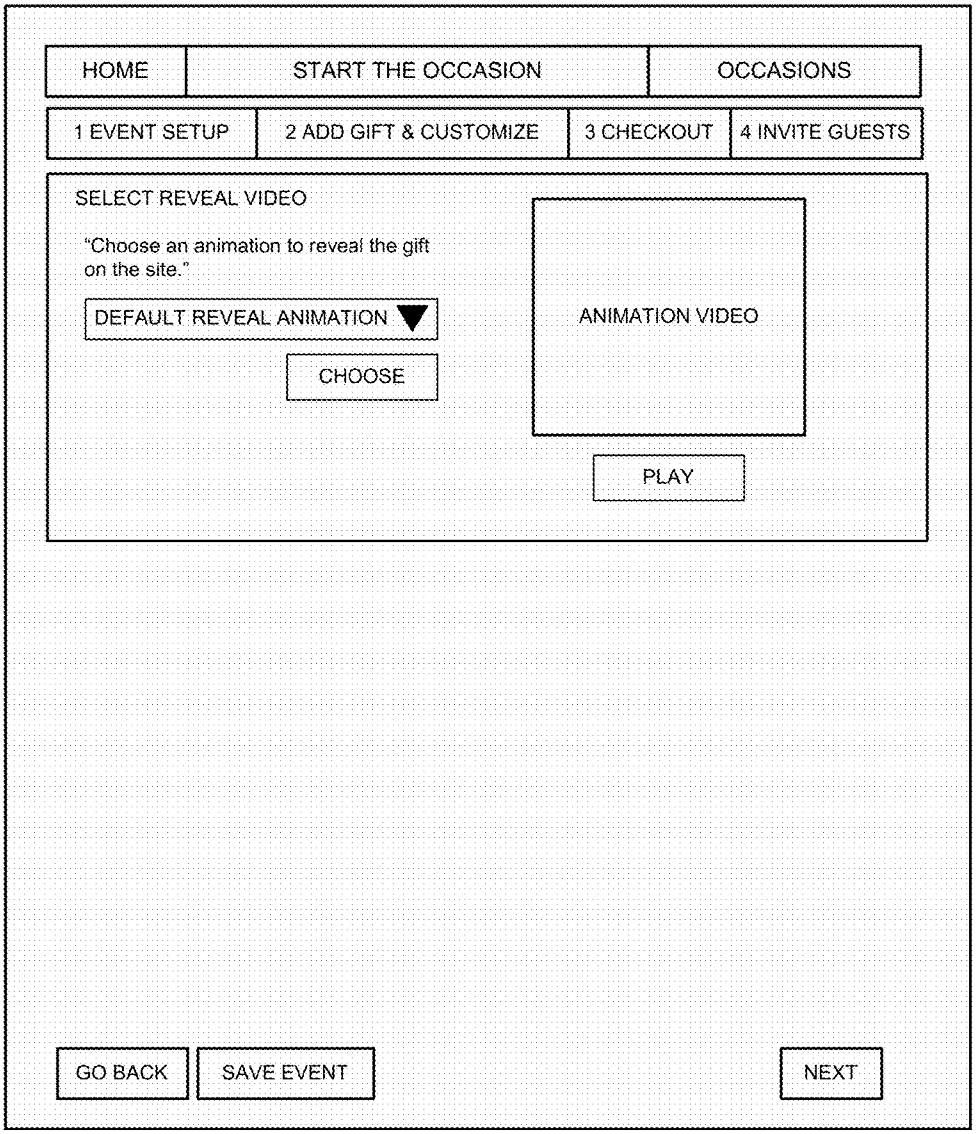
FIG. 21 illustrates an example reveal video entry screen that is generated by the application according to the teachings of the present disclosure.

In step 346, the application 104 generates a reveal video creation screen (FIG. 21) that allows the host and/or participants to create a reveal video. A reveal video generally refers to a brief video (approximately 5 to 20 seconds in length) that is played on the recipient's display when the gift is revealed. In other embodiments, the reveal video may be longer than 20 seconds or less than 5 seconds in length. In general, the reveal video is animated in form and includes content for enhancing the perceived excitement of the gift that it is associated with. For example, a reveal video associated with a sporting gift, such as a fishing pole may include content describing how wonderful the recipient's next fishing expedition may be with his or her new fishing pole.

The application 104 allows the host to select among various prerecorded video templates stored on the data source 106. The participant sending the gift card may select from a library of reveal animations, however, if no selection is made a standard, pre-selected animation may be used to announce the gift card being given. In one embodiment, the application 104 provides for customization of the reveal video by implementing images provided by the host or other participants, such as a photo of the recipient, as well as information such as text is placed by video generation software associated with the application 104 into predetermined fields within the reveal video thereby creating a customized reveal video for the recipient.

Figure 22:
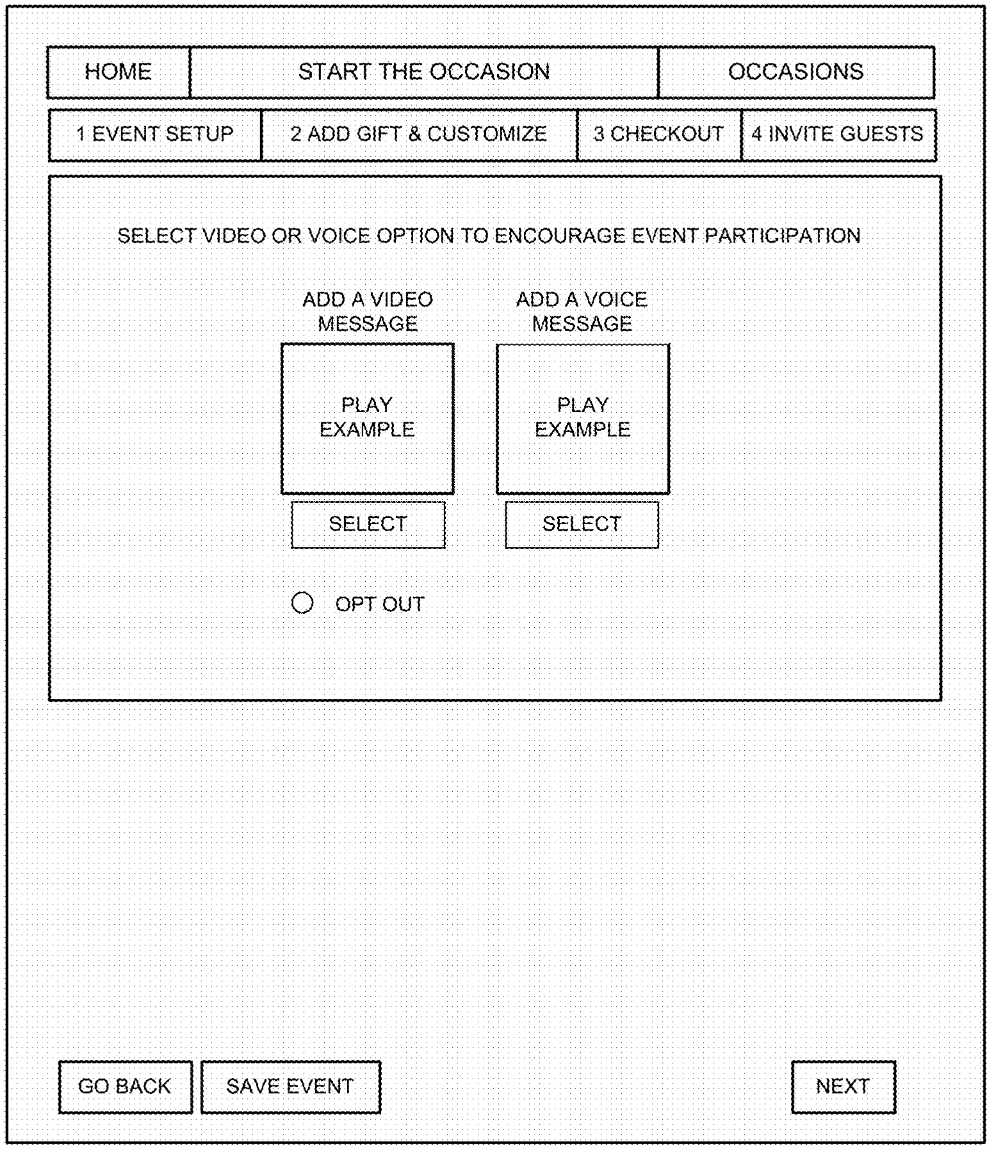
FIG. 22 illustrates an example participant encouragement generation screen that is generated by the application according to the teachings of the present disclosure.

In step 348, the application 104 generates a participation encouragement message generation screen (FIG. 22) that receives content from the host for generating a participation encouragement message to be sent to prospective participants to solicit their involvement with the PURL webpage. For example, the participation encouragement message may include a video snippet of the host describing an upcoming occasion, such as an upcoming birthday, and how involvement by invited participants in the PURL webpage would be appreciated. As shown, the participation encouragement message generation screen provides for entry of video and/or voice (e.g., audio) content to be included in the participation encouragement message. In other embodiments, any type of user-supplied content, such as textual, photographic, or other type of content may be received from the host for inclusion in the participation encouragement message.

Figure 23:
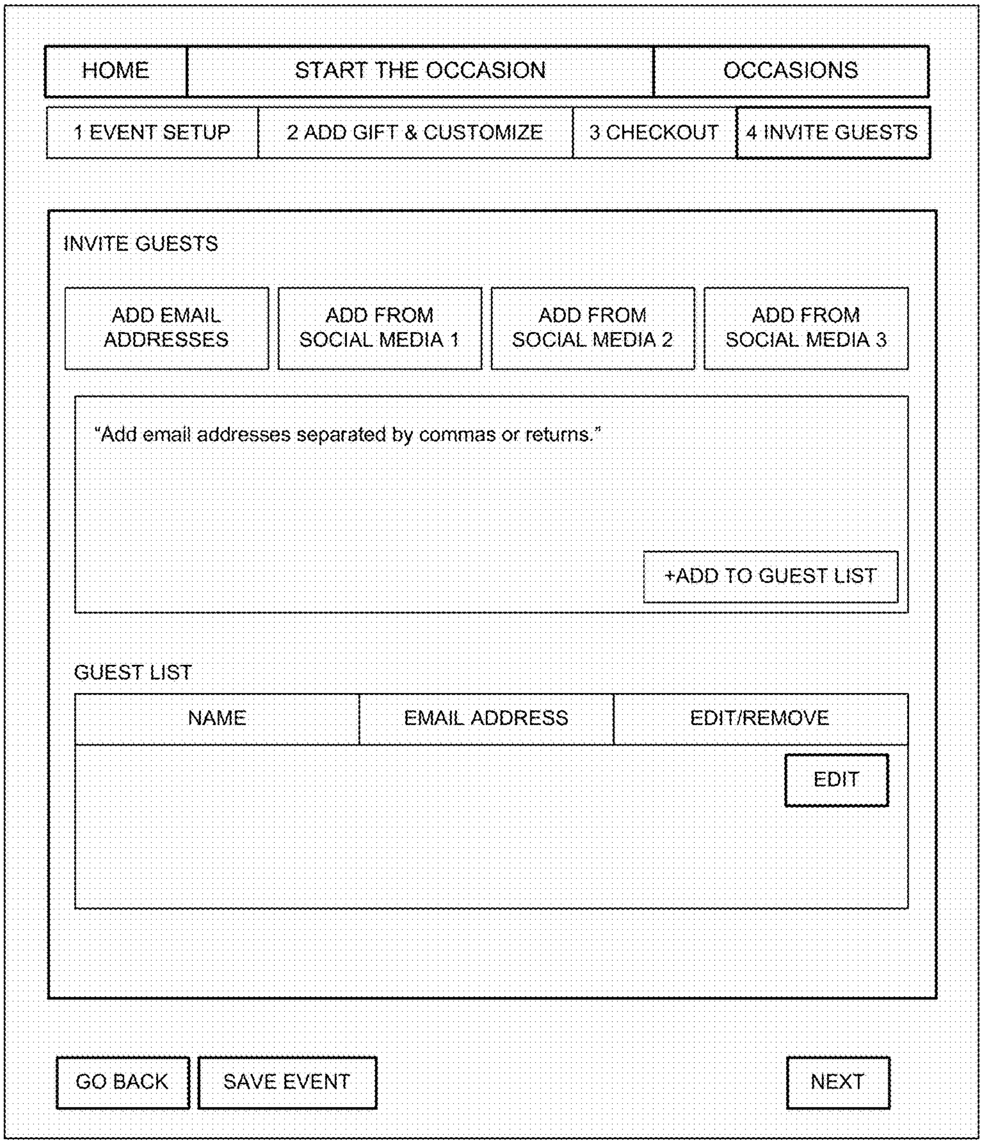
FIG. 23 illustrates an example guest invitation screen that is generated by the personalized webpage hosting system according to the teachings of the present disclosure.

In step 350, the application 104 generates a guest invitation screen (FIG. 23) that receives information associated with one or more participants that the host wishes to be associated with the PURL website. In order to invite participants to contribute to the content of the personalized webpage and/or to make gift purchase selections, a link incorporating the PURL associated with the webpage may be sent to participants via email, text message, social media or other technique.

The application 104 allows the host to enter identifying information for each participant, such as an e-mail address, or social media account. In one embodiment, the application 104 displays one or more buttons for allowing selection of participants from social media websites. For example, once a button is selected by the host, the application 104 then accesses a social media website identified by the button and retrieves all friends associated with the host on that social media website such that the host may select some or all friends to be invited to participate in the personalized website.

The invitation to participate may include graphics and text designed to encourage participation and build excitement. For example, the participation encouragement message generated in step 348 may be transmitted to each participant to encourage their involvement with the PURL webpage. In one embodiment, the application 104 sends the invitation in advance of notification of the PURL webpage to the recipient, so that participants may make contributions and selections to the webpage, as well as gift purchases, prior to presentation of the personalized webpage to the recipient. In another embodiment, the recipient may be alerted shortly after creation of the personalized webpage so that the recipient may also influence content and selections, such as by providing a wish list or other information useful for participants to make gift purchase decisions.

In step 352, the application 104 generate a miscellaneous information entry screen (FIG. 24) for receiving various types of information related to the PURL webpage. As shown, the miscellaneous information entry screen includes a field for alternatively selecting an online scrapbook to be generated by the host and/or participants to be included in the PURL webpage. Additionally, the miscellaneous information entry screen includes a notification field to be used by the application 104 for triggering the transmission of notification messages to the host when certain activity is encountered on the PURL webpage. Although only a scrapbook selection field and notification fields are shown, other embodiments may include any suitable type of fields for entry of information associated with the PURL webpage. At this point, the application 104 generates a PURL and a corresponding personalized webpage using customized information provided by the host.

Although the process of FIG. 3B describes one example of for generation of a PURL webpage, other embodiments may include other features without departing from the spirit or scope of the invention. For example, the application 104 may display one or more other screens to receive various options associated with the PURL webpage that includes for example, the cut-off date for participation in the PURL webpage, the delivery date at which the PURL webpage is made available to the recipient, one or more content features to be included in the personalized webpage, an addition or deletion of at least one of the participant users. As another example, the steps described herein may be performed sequentially or in any suitable order for performing the features of the PURL webpage generation process described herein.

Figure 3C:
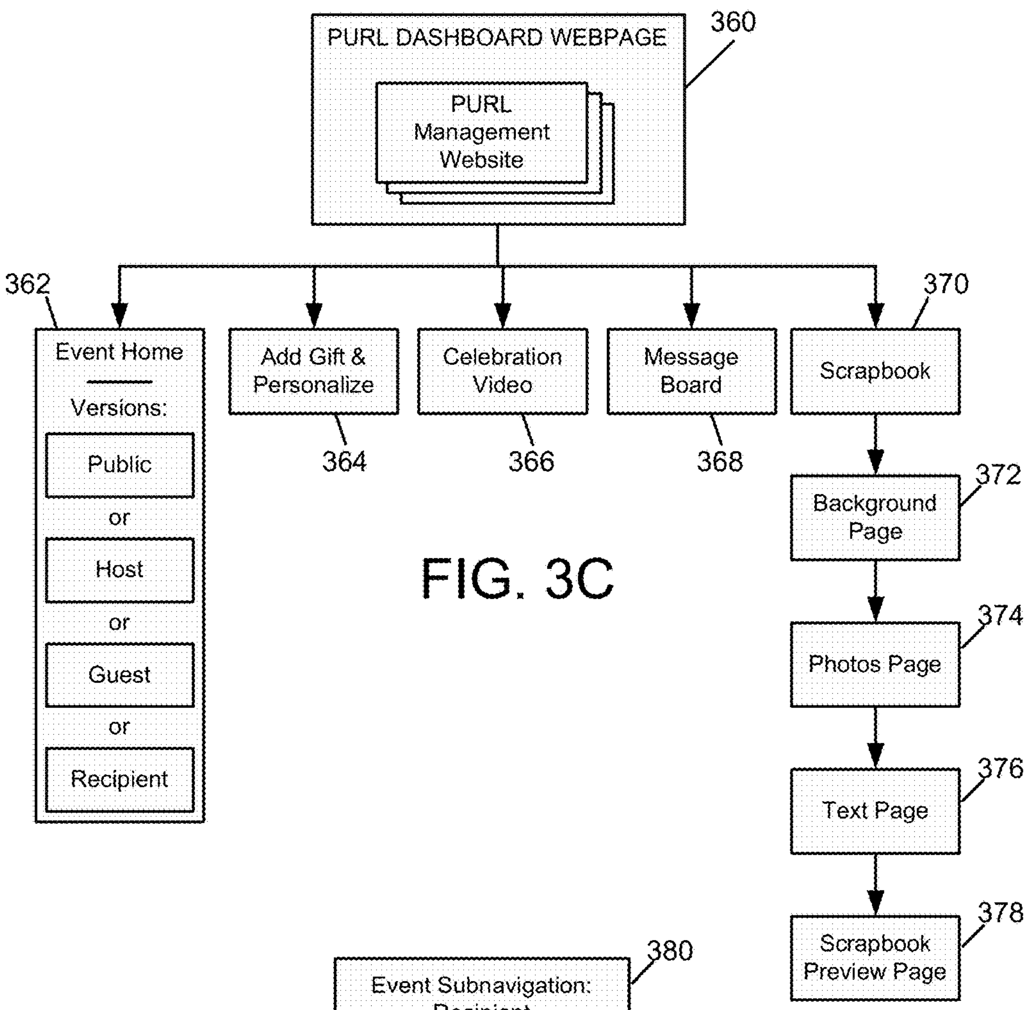
FIG. 3C is a flowchart depicting an example process of how the personalized management website is managed according to the teachings of the present disclosure.

FIG. 3C illustrates an example process of a management website that is generated by the application 104 according to the teachings of the present disclosure. The management website is accessed following creation of the original personalized webpage by host as described in the process of FIG. 3B. The management website is generated by the application 104 to provide for further enhancements to the personalized webpage by each of the host, participants, recipient, and optionally public members.

Figure 25:
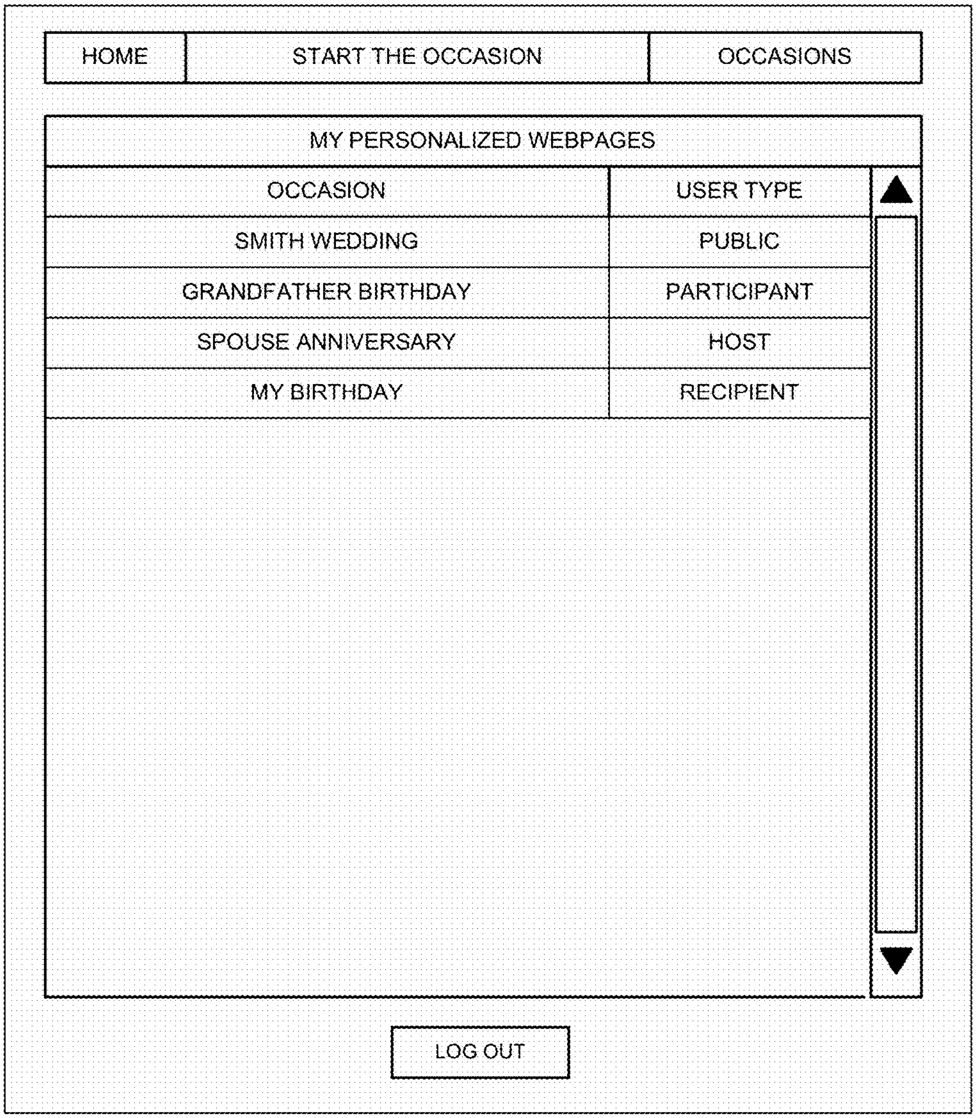
FIG. 25 illustrates an example dashboard webpage that is generated by the application according to the teachings of the present disclosure.

In step 360, the application 104 generates a home page when either of the computing devices 110, 112, and 114 of the host, participants, and/or recipient, respectively, accesses the personalized webpage via the PURL. In one embodiment, the application 104 generates a dashboard webpage (FIG. 25) that is displayed following creation of a login session with the user in step 362. Each user may simultaneously be involved in the creation and administration of multiple PURL webpages. Thus, upon creation of a login session with a user, the application 104 displays a list of each PURL webpage that the user may be a member of. In one embodiment, the application also displays those PURL webpages that are open for public view. For example, the application 104 may display a list of publicly accessible PURL webpages and provide for their entry to be included in the dashboard list of the user such that, when the user generates a login session, these public PURL websites are made available for the user's view.

In step 362, the application 104 generates a management website on the computing system (110, 112, or 114) of the host, participants, or recipient, respectively. The management website may be accessed via any suitable means. For example, the management website may be accessed through the website dashboard as described above. As another example, the management website may be accessed through a standard URL entered into a browser executed on the user's computing system (110, 112, or 114).

Figure 26:
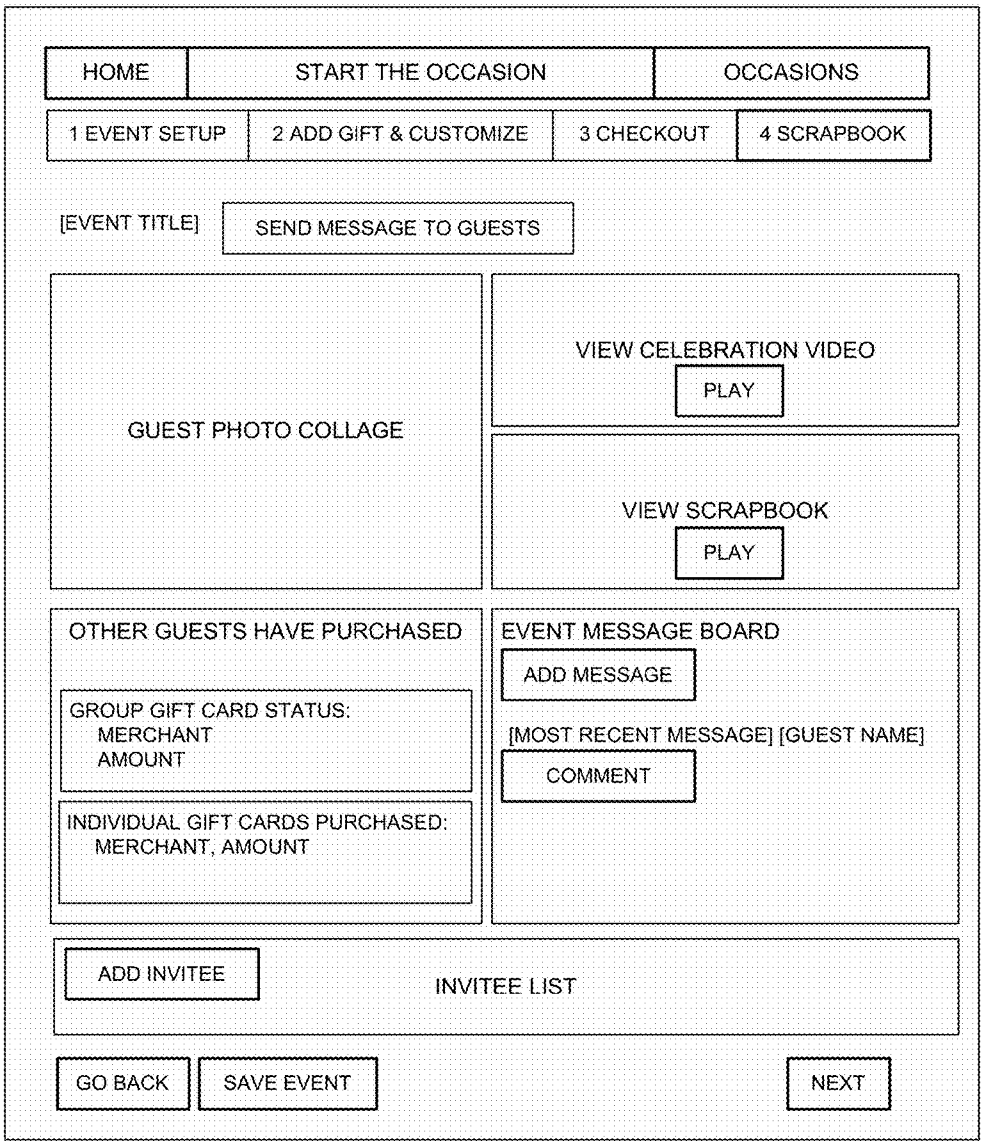
FIG. 26 illustrates an example home page screen that is generated by the application according to the teachings of the present disclosure.

A version of the management website is accessed according to an identity of the user that accesses the personalized webpage. For example, the application 104 generates a home page screen (FIG. 26) that is displayed for the host and/or participants. In one embodiment, the application 104 provides session management for access to the personalized webpage using a login screen in which each user, such as a public user, the host, participants, or recipient may enter identifying information, such as a user name and password for providing a session to view and/or modify content included in the personalized webpage. In one embodiment, the session provided for all users other than the host has limited modification rights relative to the host. The public user generally refers to a generic user who is neither a host, a participant, nor a recipient associated with the personalized webpage. In one embodiment, an administrative operation of the host includes whether the personalized webpage is to be a public webpage or a private webpage. For example, if the host designates the personalized webpage to be a public webpage, access to the personalized webpage is allowed for public users; however, if the host designates the personalized webpage to be a private webpage, access to the personalized webpage by public users is not allowed.

In another embodiment, the application 104 provides another administrative operation of allowing the host to add or delete one or more content features, such as the celebration video or scrapbook, from the personalized webpage. For example, after the application 104 has generated the personalized webpage and participants have begun inputting content, it is noted that an additional scrapbook should be generated for a particularly memorable occasion known among the host, certain participants, and the recipient. In this case, the application 104 provides a means for the host to generate a second scrapbook commemorating the particularly memorable event even after the personalized webpage has been initiated.

Steps 364 through 378 generally described actions that may be taken by the application 104 in process or otherwise generate the personalized URL via the management website by the host, participants, and/or recipient. In one embodiment in which the management website is publicly available, the application 104 may allow a public member to perform certain of steps 364 through 378. For example, the application 104 may allow a public member to select a gift for the recipient while inhibiting the public member from adding content to the celebration video and/or scrapbook. In step 364, the application 104 generates a gift selection screen for receiving information associated with one or more gifts. The application 104 provides for adding additional monetary value to a previously selected gift, such as a gift card; or alternatively, selection of a new gift by the host, participant, or public member.

In one embodiment, the application 104 performs analytics using information about the recipient to generate suggested gift selections for the host, participants, and optionally public members. The recipient information may be obtained from the host, participants, and/or one or more social media outlets. The application 104 includes various selection criteria to construct a user profile that is used to select or generate special offers or to provide suggested gift card types or vendors to participants. Examples of such selection criteria may include an event type, an age of the recipient, a gender of the recipient, and a geographical region in which the recipient resides. As a particular example, analytics performed on a male recipient residing in Chicago, Ill. having his 14th birthday reveals that he has an interest in computer gaming. The application 104 uses this information to suggest one or more gaming coupons for computer games. When such criteria is associated with a particular offer or offers, analytics based on user input such as click-throughs, will be tracked and evaluated either via system algorithms or by system personnel for continual improvement of the criteria type and associated values.

In step 366, the application 104 receives textual, audio, photographic, and/or video content from the host and/or participants for entering content to a celebration video to be included in the personalized webpage. For example, the application 104 may allocate a specified time portion of the celebration video for each participant to enter a video segment to be included in the celebration video. Additionally, the application 104 may provide for embellishments to existing video segments by certain participants. The host and/or participants are provided with an option to preview the video and make changes to the entered information. When the host is satisfied with the video, it is saved to the data storage.

Figure 27:
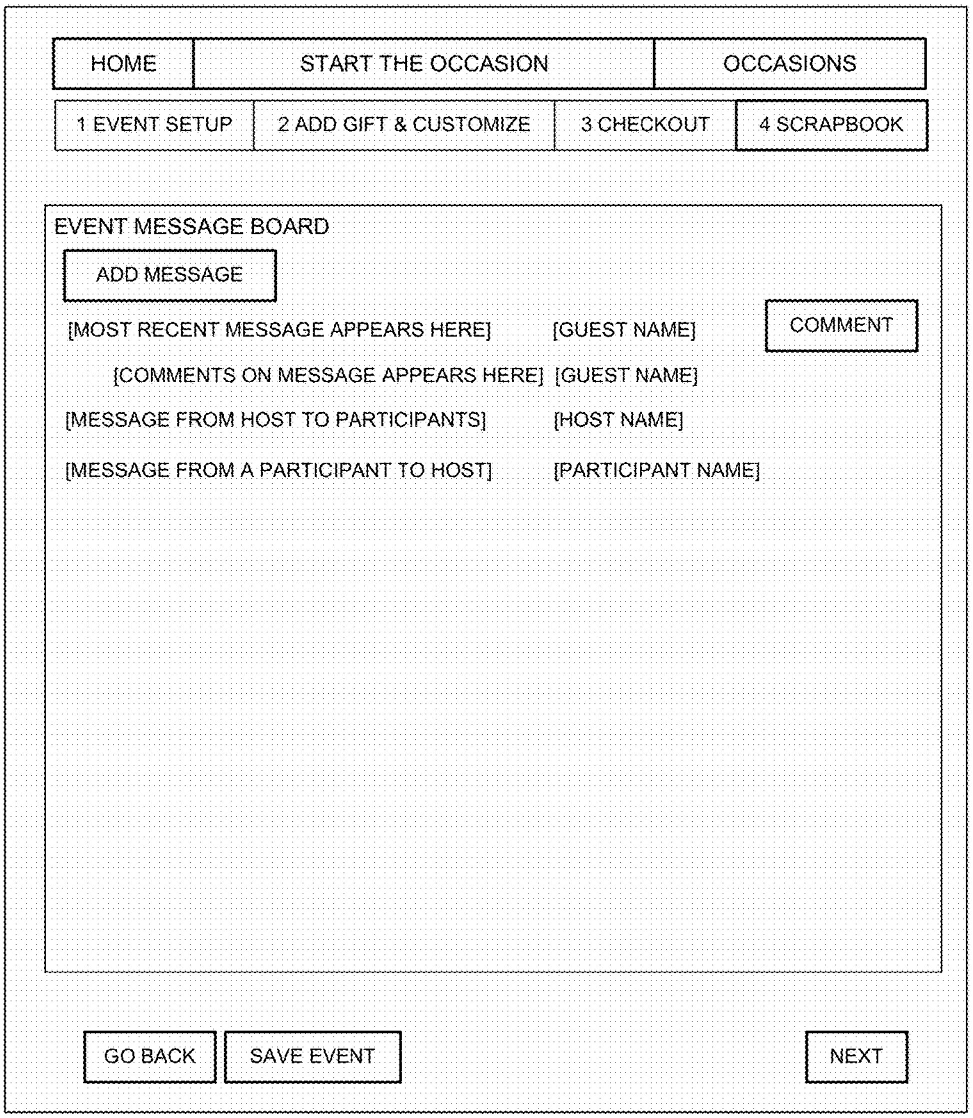
FIG. 27 illustrates an example event message board screen that is generated by the application according to the teachings of the present disclosure.

In step 368, the application 104 displays a message board (FIG. 27) for the host, participants, and recipient to communicate with one another via the management website. The message board generally functions in a manner similar to a bulletin board or web log (blog) in which the host, participants, and recipient may send messages to one another and respond to messages sent from other members.

In step 370, the application 104 activates a scrapbook according to upon request from the computing device of the host or one of the participants. The pages of the scrapbook can be selected from a library of predesigned scrapbook page templates including predesigned photo layouts and page designs. The scrapbook functionality typically may be accessed by all participants to view and to upload images. Images may be uploaded from a participant's computer or mobile device (e.g. cell phone, smart phone, pad or tablet) or may be selected from a social media site such as FACEBOOK™, TWITTER™, PINTEREST™, INSTAGRAM™, YOUTUBE™, and GOOGLE™.

The scrapbook is typically viewable by all participants throughout the event creation process as part of the recipient's personalized webpage. The scrapbook displays the provided or selected photographs or other images and allows a participant who uploads an image to include a brief description, or caption, with the image. Participants may also provide and associate comments with each image in the scrapbook. The various photos that are added may be sized, moved or repositioned on a scrapbook page by the participant who is adding the photos and customizing the album page. Additionally, photos may also be added, deleted, sized, moved or repositioned by the recipient.

A physical, printed scrapbook including the image content of the online scrapbook may be ordered from the administrator of the PURL management webpage. Printed scrapbooks are typically made available for ordering once the personalized webpage has been created and provided for access to the gift recipient. The gift recipient or a participant may select from a number of scrapbook covers and templates to be used with a printed album and may place an order by which the selected images will be printed, compiled and bound into a physical album mailed to the ordering participant. In certain embodiments, only the recipient may select printed scrapbook criteria such as images, covers and templates. In such a case, participants in the event typically may also order and purchase the album designed by the gift recipient. In other embodiments of the system, any participant may make such selections to create a printed scrapbook personalized for that participant.

Once the scrapbook is activated, the application 104 generates various pages, such as a background page that includes content summarizing other content included in the scrapbook (step 372), one or more photo pages including photographs entered by the host and/or one or more participants (step 374), one or more text pages including textual content entered by the host and/or one or more participants (step 376). At any point during the scrapbook generation process, the host and/or participants may review the scrapbook for visualizing the scrapbook as it would be viewed by the recipient (step 378).

At the delivery date set by the host, the application 104 sends a message, such as an email notification message or other type of messaging system to the gift recipient and includes a link to a personalized webpage identified by a PURL. The personalized webpage and PURL are both created by the system in response to selections and information provided by the host. Typically, the PURL will incorporate some portion of the recipient's name or other personal identifier. In certain instances the identifier may relate to the name of a company or organization. The personalized webpage may include information provided by the host such as the recipient's name, images, messages to the recipient, and information regarding gifting. Means may be provided for the recipient to add information to the webpage such as a wish list or a message to participants that view or interact with the webpage. Means may also be provided for participants, such as friends, relatives, or coworkers to add information for presentation on the webpage or other use by the system, such as details of an event (e.g. birthday party), messages to the recipient, or photos or video clips of an event. Information generated by the system or provided by the system provider may also be presented on the webpage such as information identifying gifting opportunities for a party interacting with the webpage. Information provided by a gift card vendor, or affiliates of the system provider or gift card vendor, may also be provided. For example, offers and advertisements generated by or on behalf of the gift card vendor or affiliate may be displayed.

In order to alert the recipient to the personalized webpage, and to provide a link incorporating the PURL associated with the webpage, the system may generate an email, text message, social media message or similar means of communication to the recipient. In one embodiment, the application 104 generates a notification to the recipient via a social media outlet. The application 104 may include network APIs and JavaScript SDKs, for example, using the Facebook SDK to invoke various social network APIs. It should be appreciated that communications between the system and social media networks make occur by any operable means. In addition to a link to the personalized webpage, posts generated by the social media outlets may provide additional information related to the recipient and event and provide a means for coordinating activities related to the event.

As an alternative to e-mail or text messages to convey links, QR codes may be provided on gift cards, gift card holders, inserts, backer panels, correspondence, or other physical items conveyed to the gift recipient. These QR codes may be used as an alternative machine-readable method to encode and convey links or other information relative to the system.

Figure 3D:
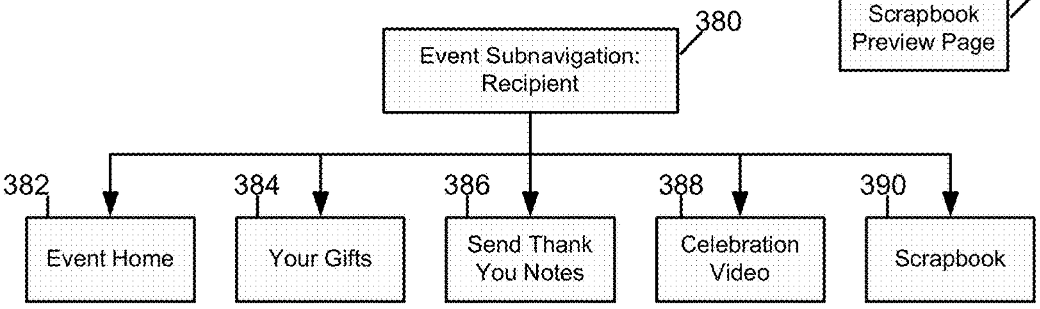
FIG. 3D is a flowchart depicting an example process for displaying the personalized webpage to the recipient by the application according to the teachings of the present disclosure.
Figure 28:
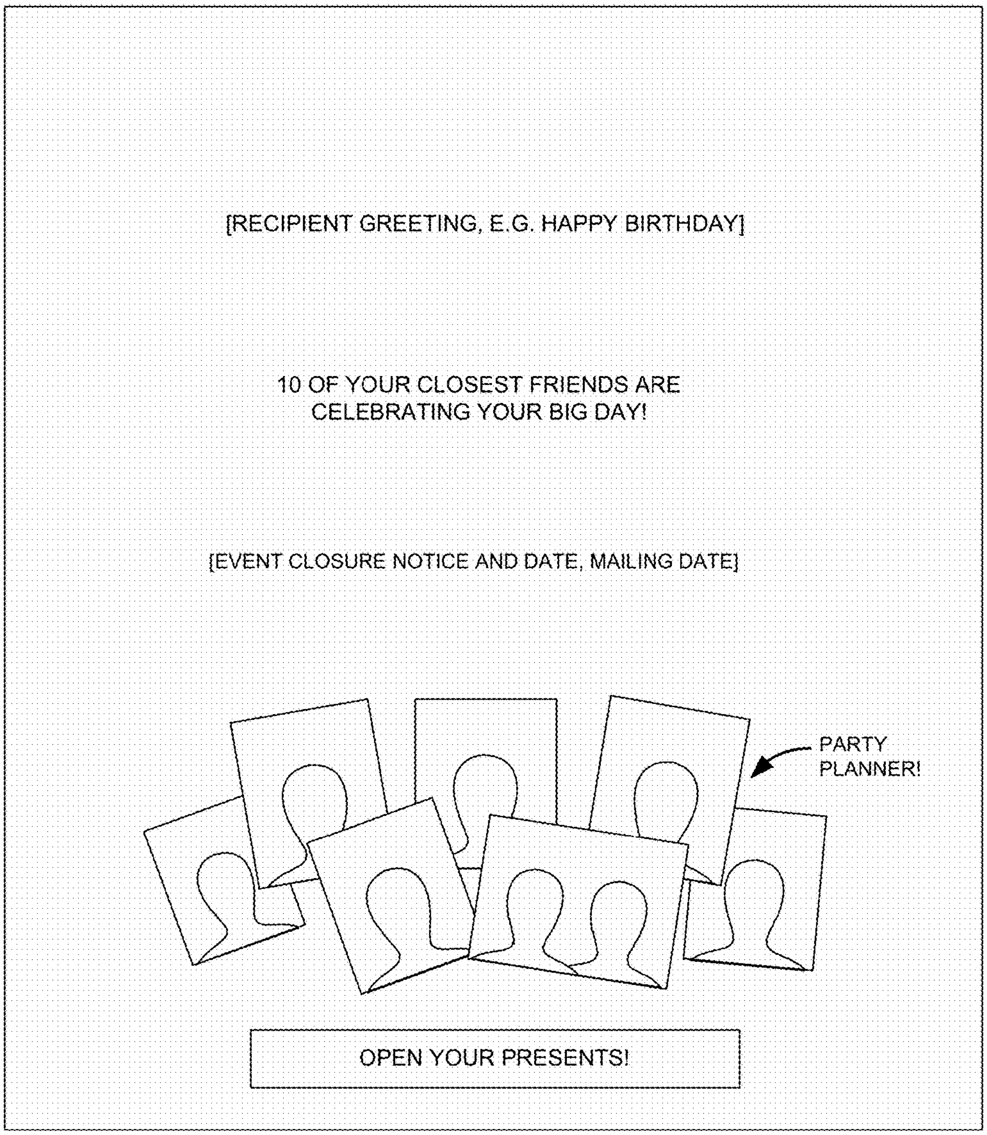
FIG. 28 illustrates an example initial splash screen that is generated by the application according to the teachings of the present disclosure.

FIG. 3D illustrates an example process for displaying the personalized webpage to the recipient by the application 104 according to the teachings of the present disclosure. In step 380, the application 104 generates the personalized webpage when the recipient enters the personalized URL in a conventional web browser. Upon receipt of the personalized URL, the application 104 generates an initial splash screen (FIG. 28) that is displayed for the recipient. In one embodiment, the personalized webpage may be accessed through a user session established with the dashboard website described above. In one embodiment, the splash screen includes a background image including user-supplied content provided by each of the participants. For example, the background image includes a photo collage of each of the participants who helped generate the personalized webpage.

Figure 29:
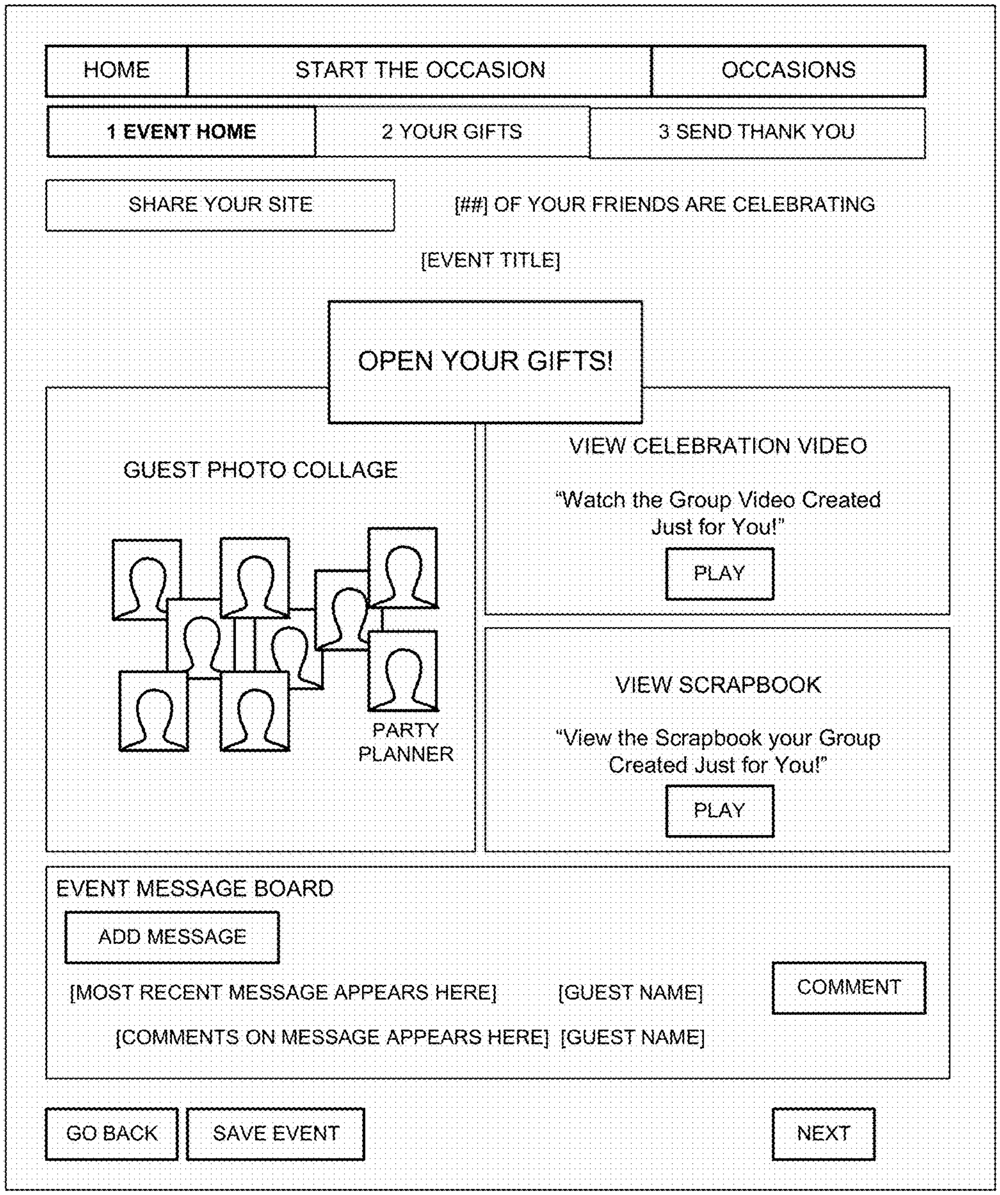
FIG. 29 illustrates an example recipient home page screen that is generated by the application according to the teachings of the present disclosure.

The splash screen includes a hypertext link for receiving an instruction by the recipient to view the various features of the personalized webpage. For example, the application 104 generates a recipient home page screen (FIG. 29) that allows the recipient to browse through the various features of the personalized webpage previously generated by the host and participants (step 382).

Figure 30A:
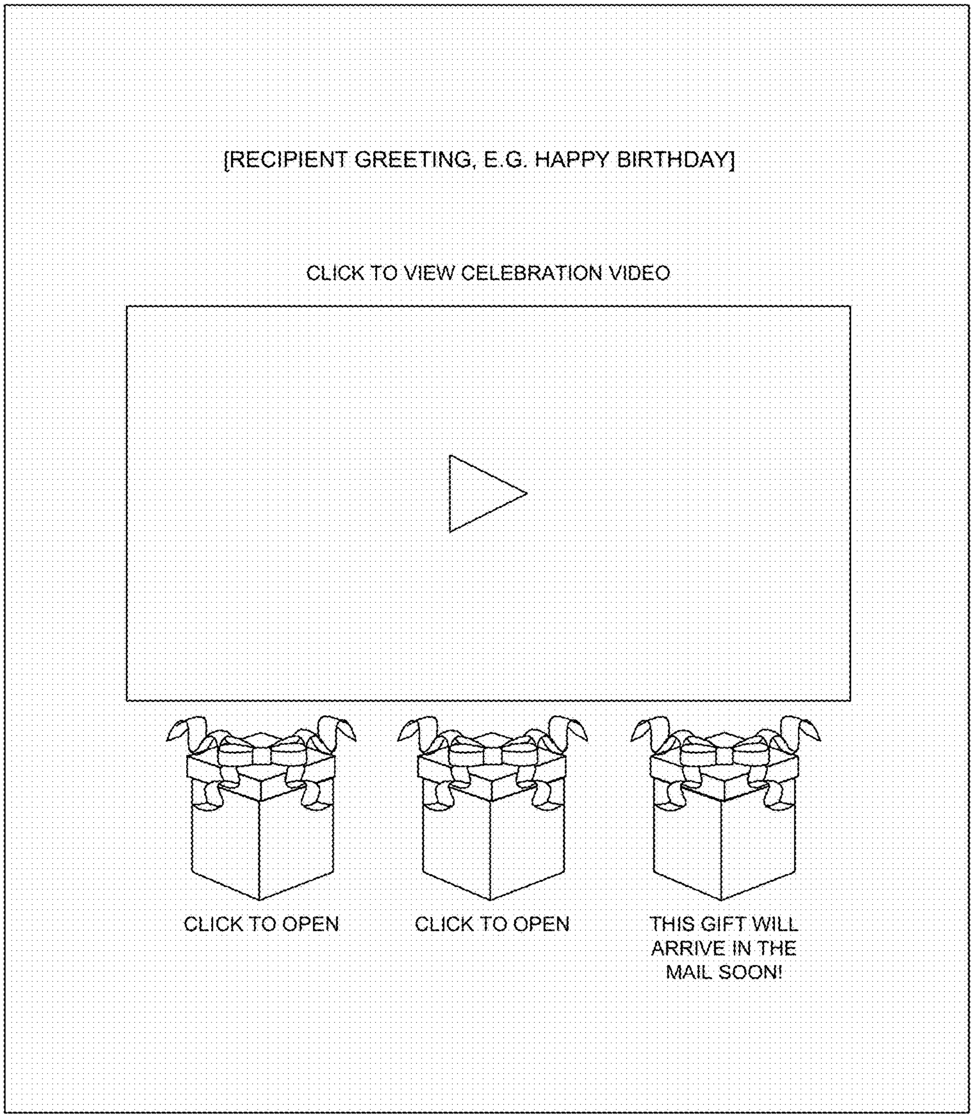
FIG. 30A illustrates an example recipient gifting screen that is generated by the application according to the teachings of the present disclosure.
Figure 30B:
FIG. 30B illustrates example monikers that are displayed on the recipient gifting screen according to the teachings of the present disclosure.
Figure 30C:
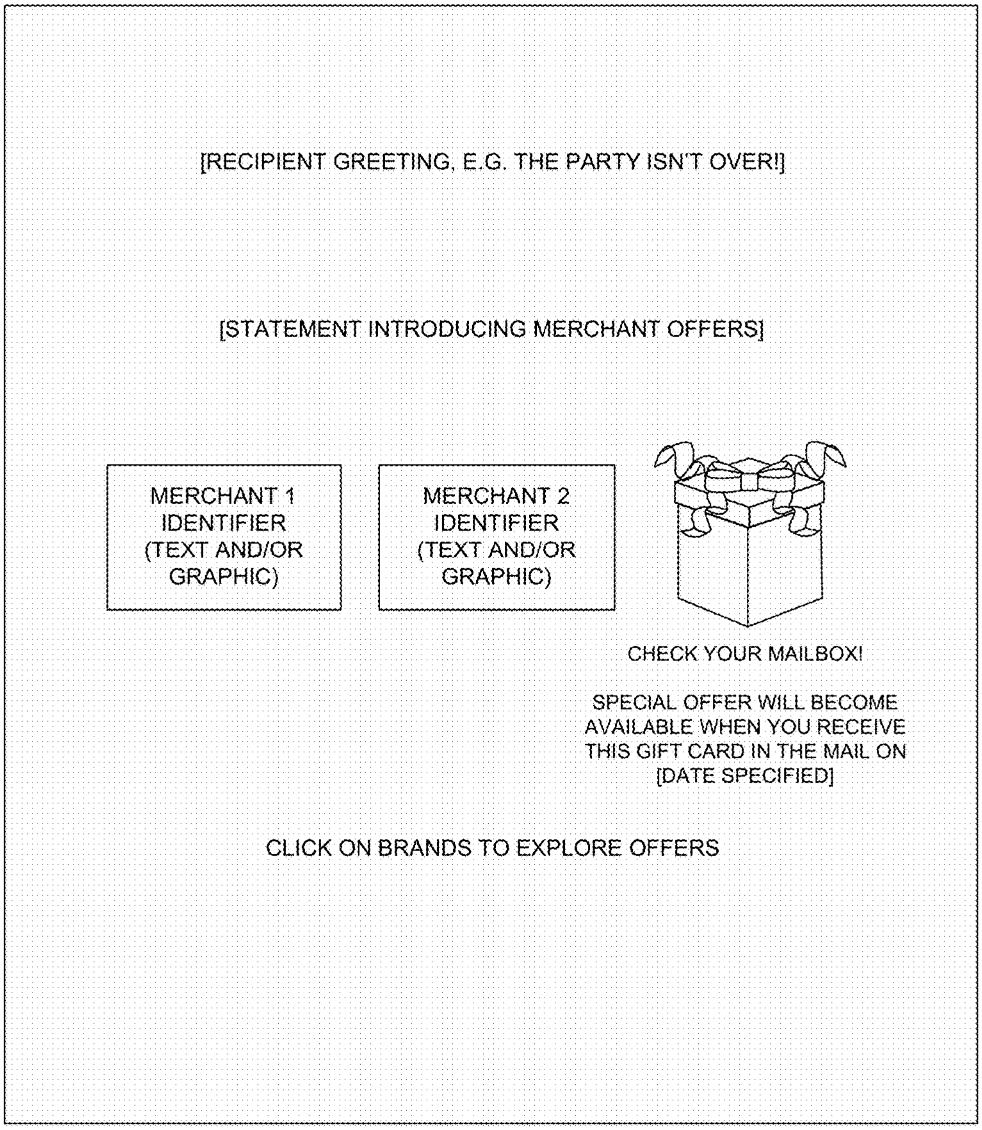
FIG. 30C illustrates an example merchant offer screen that is generated by the application according to the teachings of the present disclosure.
Figure 30D:
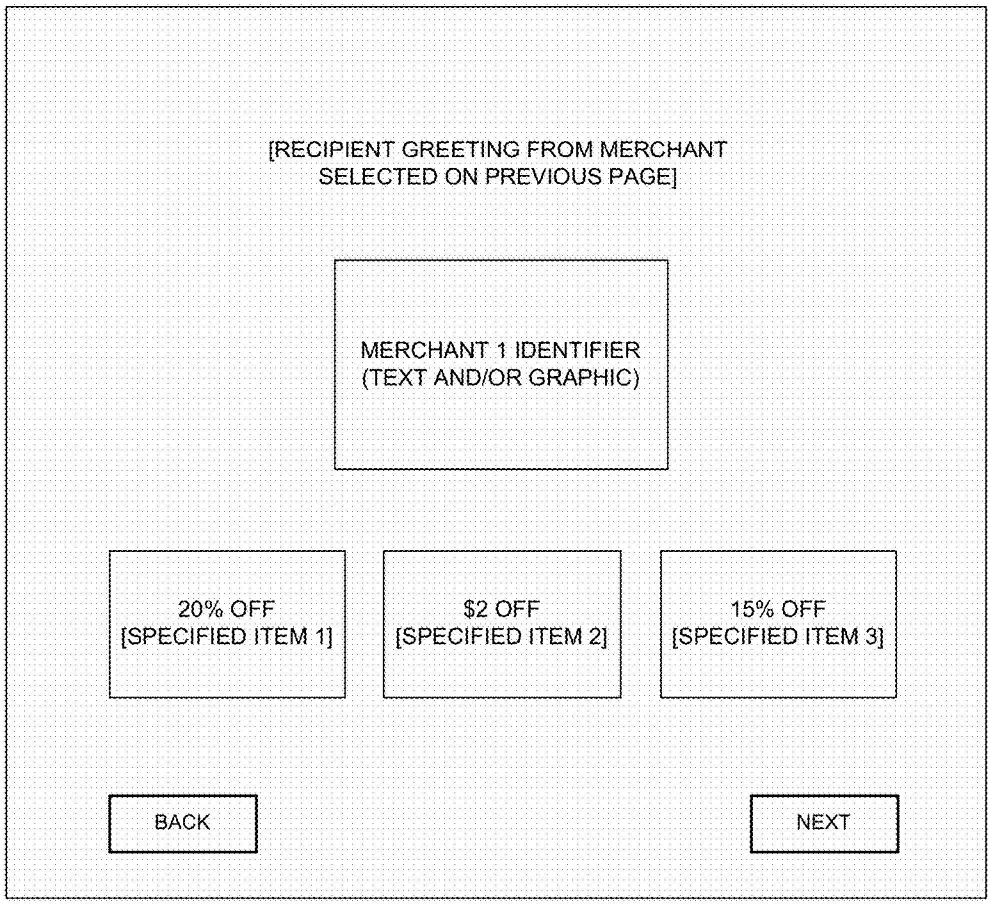
FIG. 30D illustrates example expanded monikers that are generated on the merchant offer screen by the application according to the teachings of the present disclosure.

In step 384, the application 104 generates a gifting screen (FIG. 30A) when the recipient selects a gifting hypertext link from the recipient home page. The gifting screen includes monikers that may be expanded by the application 104 when selected by the recipient as shown in FIG. 30B. In one embodiment, the a merchant offer screen (FIG. 30C) is generated by the application 104 to display one or more merchant offerings provided by certain merchants who have previously formed advertising agreements with the administrator of the PURL management webpage. The merchant offer screen includes other monikers that may be expanded by the application 104 when selected by the recipient as shown in FIG. 30D.

Figure 31:
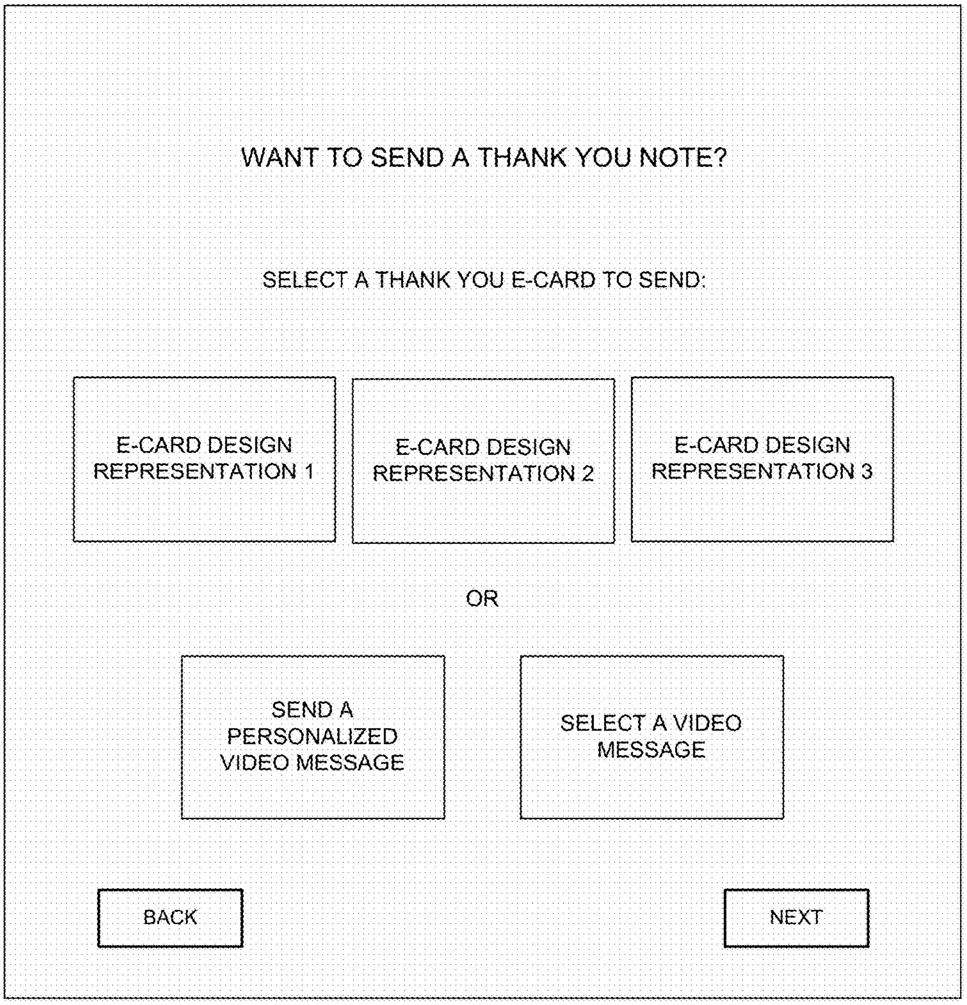
FIG. 31 illustrates an example thank you screen that is generated by the application according to the teachings of the present disclosure.

In step 386, the application 104 generates a thank you screen (FIG. 31) for entry of thank you information to be sent to the participant and the participants. That is, the application 104 provides for selection of thank you cards, typically electronic or e-cards, among which the recipient may choose for transmission to the host and the one or more participants. Additionally, the system may provide means for the recipient to select among and/or customize a video message to participants. E-cards, video messages or links thereto may all be posted by or through the system to social media sites. The application 104 may also provide means for the recipient to send a physical thank you card that is personalized with photos, sound, text or video and sent to a selected participant, several selected participants, or to all participants.

From the home screen, the application may display various other screens, such as the celebration video that has been generated by the host and participants (step 388), and the scrapbook that has been generated by the host and participants (step 390).

A personalized URL and associated personalized webpage has been herein described that provides a technique for group collaboration to generate a gifting mechanism for a recipient using user-supplied textual, audio, photographic, and/or video content that may include one or more gift cards. Whereas conventionally implemented gift cards are typically small in size thus minimizing any visual appeal that may otherwise be obtained with physically larger retail products. Additionally, due to the gift cards' relatively small size, only a limited amount of information may be placed on these gift cards. Embodiments of the present disclosure provide a solution to this problem via an online personalized webpage for including personalized information and/or one or more customized gift cards for a recipient.

A system according to the present invention includes a graphical user interface (GUI) for entry of information by a host identifying a gift recipient and one or more participants. The host generally refers to as an administrator of the personalized webpage while the participants are generally referred to as users of the webpage having limited rights relative to the host. The host and the participants may enter content, such as text, sound, images or video relevant to the recipient and/or to an event associated with the recipient. The system may use portions of this information, or other information, to create a personalized webpage identified and located via a personal uniform resource locator (PURL). The personalized webpage is addressed by the PURL which is created using information provided by the host. A recipient's name can be utilized by the system when generating (naming) the PURL or the PURL can be custom named by the host. A unique identifier may be included in the PURL to avoid users creating duplicate PURLs.

It is to be understood that while certain forms of this invention have been illustrated and described, it is not limited thereto except insofar as such limitations are included in the following claims and allowable equivalents thereof.

What is claimed is:

1. A personalized webpage gifting system comprising:

a server in communication with a computing device and comprising at least one processor; and an application executable by the at least on processor to:

generate a first graphical user interface (GUI) to display a dashboard webpage including a plurality of hypertext links to a corresponding plurality of personalized uniform locators (URLs);

receive a selection of one of the personalized URLs;

responsive to the selection of the one of the personalized URLs, generate a second GUI to display a personalized webpage comprising personalized content for a recipient that has been received from a plurality of participants; and combine the personalized content into a personalized content structure, wherein the personalized content comprises information associated with a gift purchased by the participants for the recipient, wherein the gift is selected by the participants from a group of suggested gifts presented via the second GUI, wherein the suggested gifts are selected by an analytics management module by analyzing information associated with the recipient, wherein the information associated with the recipient is continually updated based at least in part on click-throughs performed by at least the recipient;

wherein the personalized content structure comprises individual segments of the personalized content from at least one of the plurality of participants, wherein the personalized content is provided in the form of a multimedia presentation, wherein at least a portion of the personalized content structure is received from a peripheral device accessible via the second GUI, wherein the personalized content structure comprises a celebration video, wherein the personalized content is added to the celebration video at predetermined placement areas that are marked and tracked within the celebration video.

2. The personalized webpage gifting system of claim 1, wherein the application is executable to display the dashboard webpage within a login session.

3. The personalized webpage gifting system of claim 1, wherein the application is executable to limit access to each personalized webpage according to a type of user associated with the login session.

4. The personalized webpage gifting system of claim 1, wherein the application is executable to receive instructions associated with public access to each personalized webpage, and limit public access to each personalized webpage according to the received instructions.

* * * * *